(12) United States Patent
Nagata et al.

(10) Patent No.: US 10,898,858 B2
(45) Date of Patent: Jan. 26, 2021

(54) MEMBRANE DISTILLATION APPARATUS AND HYDROPHOBIC POROUS MEMBRANE

(71) Applicant: Asahi Kasei Kabushiki Kaisha, Tokyo (JP)

(72) Inventors: Kazuto Nagata, Tokyo (JP); Hiroyuki Arai, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/324,088

(22) PCT Filed: Jul. 9, 2015

(86) PCT No.: PCT/JP2015/069807
§ 371 (c)(1),
(2) Date: Jan. 17, 2017

(87) PCT Pub. No.: WO2016/006670
PCT Pub. Date: Jan. 14, 2016

(65) Prior Publication Data
US 2017/0173536 A1    Jun. 22, 2017

(30) Foreign Application Priority Data

Jul. 10, 2014 (JP) .................... 2014-142543
May 1, 2015 (JP) .................... 2015-094364

(51) Int. Cl.
*B01D 61/36* (2006.01)
*B01D 63/02* (2006.01)
(Continued)

(52) U.S. Cl.
CPC .......... *B01D 61/36* (2013.01); *B01D 61/364* (2013.01); *B01D 61/366* (2013.01); *B01D 63/02* (2013.01);
(Continued)

(58) Field of Classification Search
None
See application file for complete search history.

(56) References Cited

U.S. PATENT DOCUMENTS 5,232,601 A * 8/1993 Chu .................. B01D 67/0011
210/321.8
5,565,153 A   10/1996 Chidlaw et al.
(Continued)

FOREIGN PATENT DOCUMENTS

EP    1251102 A1    10/2002
JP    S60-227802 A   11/1985
(Continued)

OTHER PUBLICATIONS

International Search Report issued in corresponding International Patent Application No. PCT/JP2015/069807 dated Oct. 13, 2015.
(Continued)

*Primary Examiner* — Krishnan S Menon
(74) *Attorney, Agent, or Firm* — Morgan, Lewis & Bockius LLP

(57) ABSTRACT

The present invention provides a membrane distillation apparatus that comprises an evaporation part comprising a liquid phase part 1 in which water to be treated flows, a gas phase part 1, and a hydrophobic porous membrane that separates the liquid phase part 1 and the gas phase part 1, a condensation part comprising a liquid phase part 2 in which cooling water flows, a gas phase part 2, and a cooling member that separates the liquid phase part 2 and the gas phase part 2, and a gas phase part 3 connecting the gas phase part 1 with the gas phase part 2, wherein the pressure of the gas phase parts 1 to 3 is 1 kPa or higher and the saturated steam pressure of water at the temperature of water to be treated or lower.

20 Claims, 10 Drawing Sheets

(51) Int. Cl.
 B01D 69/02 (2006.01)
 B01D 71/34 (2006.01)
 B01D 71/36 (2006.01)
 B01D 69/08 (2006.01)
 B01D 71/26 (2006.01)
 B01D 71/68 (2006.01)

(52) U.S. Cl.
 CPC ............. B01D 69/02 (2013.01); B01D 69/08 (2013.01); B01D 71/26 (2013.01); B01D 71/34 (2013.01); B01D 71/36 (2013.01); B01D 71/68 (2013.01); B01D 2311/106 (2013.01); B01D 2311/14 (2013.01); B01D 2323/04 (2013.01); Y02W 10/37 (2015.05)

(56) References Cited

U.S. PATENT DOCUMENTS

| | | | |
|---|---|---|---|
| 6,716,355 | B1 | 4/2004 | Hanemaaijer et al. |
| 2009/0297822 | A1* | 12/2009 | Fujimura ................ B01D 69/12 428/314.2 |
| 2010/0051549 | A1* | 3/2010 | Ma ........................ B01D 61/364 210/640 |
| 2010/0072135 | A1 | 3/2010 | Hanemaaijer et al. |

FOREIGN PATENT DOCUMENTS

| | | |
|---|---|---|
| JP | H04-346823 A | 12/1992 |
| JP | H05-037328 | 5/1993 |
| JP | H06-007644 A | 1/1994 |
| JP | H08-323166 A | 12/1996 |
| JP | H09-024249 A | 1/1997 |
| JP | H11-267644 A | 10/1999 |
| JP | 2002-253940 A | 9/2002 |
| JP | 2005-329087 A | 12/2005 |
| JP | 4491153 B2 | 6/2010 |
| JP | 2011-167628 A | 9/2011 |
| JP | 2011-200770 A | 10/2011 |
| JP | 5036822 B2 | 9/2012 |
| JP | 2013-034927 A | 2/2013 |
| JP | 2013-066881 A | 4/2013 |
| WO | 00/72947 A1 | 12/2000 |
| WO | 2013/151498 A1 | 10/2013 |

OTHER PUBLICATIONS

Partial Supplementary European Search Report issued in European Patent Application No. 15818613.0 dated Jul. 7, 2017.
Wei et al., "CF4 plasma surface modification of asymmetric hydrophilic polyethersulfone membranes for direct contact membrane distillation," Journal of Membrane Science, 407-408: 164-175 (2012).
International Preliminary Report on Patentability and Written Opinion issued in corresponding International Patent Application No. PCT/JP2015/069807 dated Jan. 10, 2017.
Supplementary European Search Report issued in European Patent Application No. 15818613.0 dated Nov. 2, 2017.

* cited by examiner

[Figure 1]
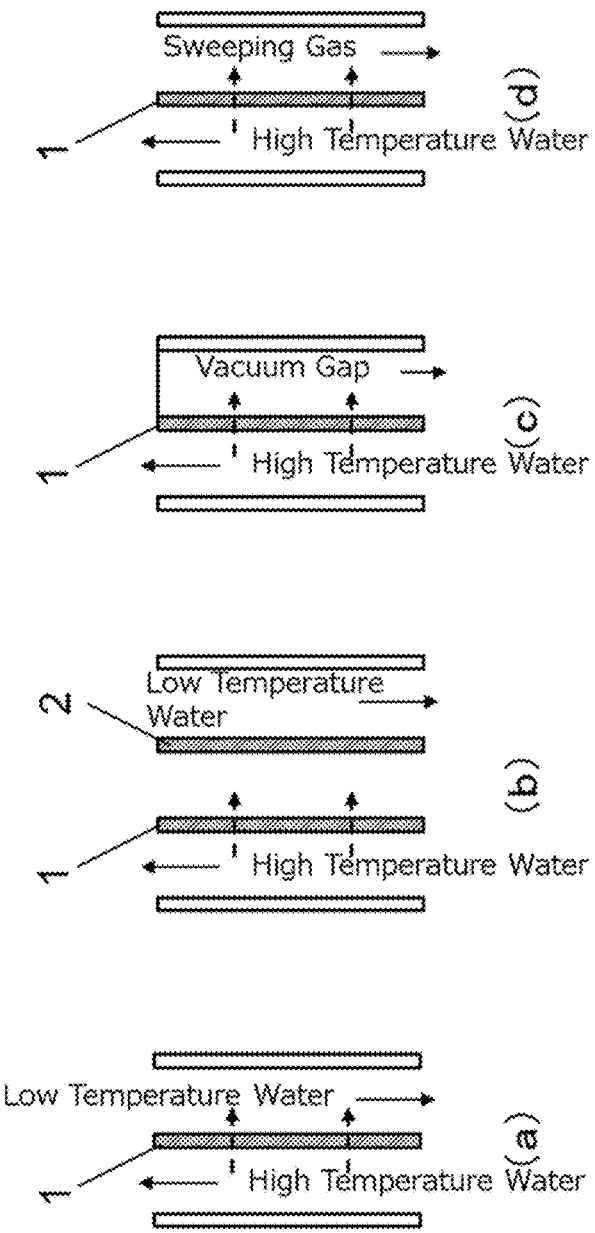

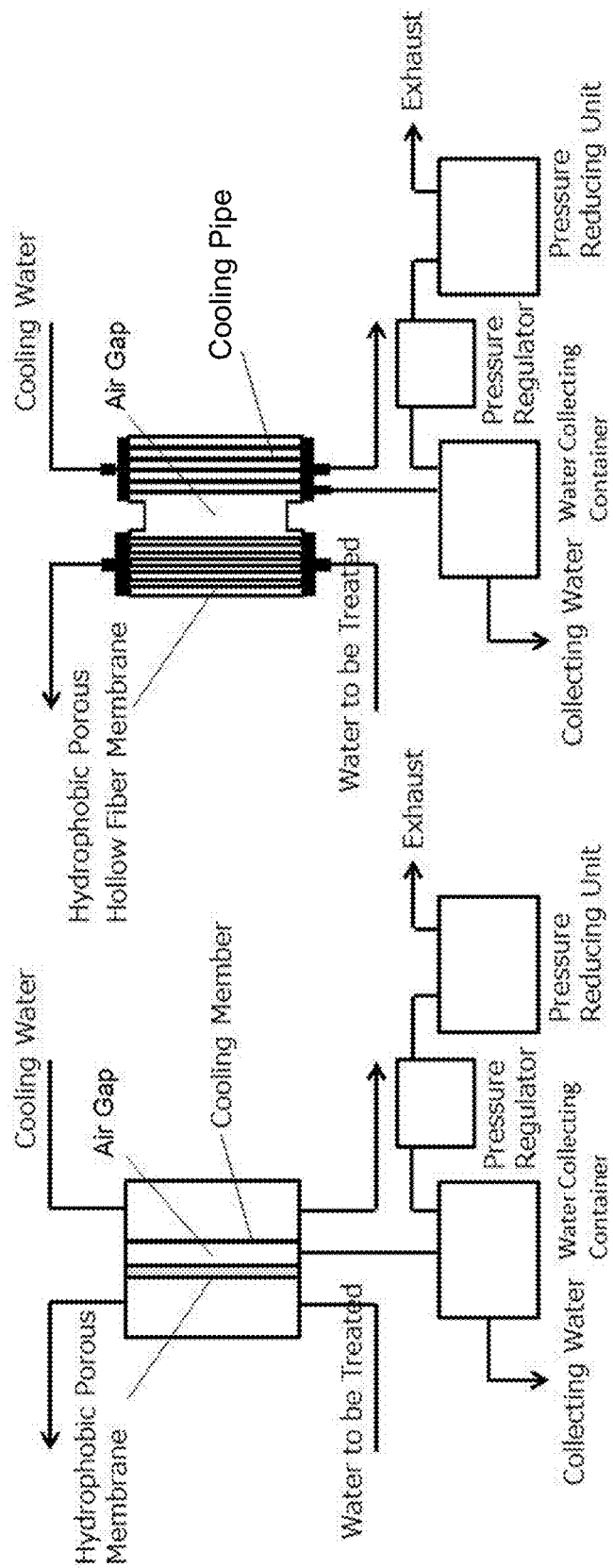

[Figure 3]
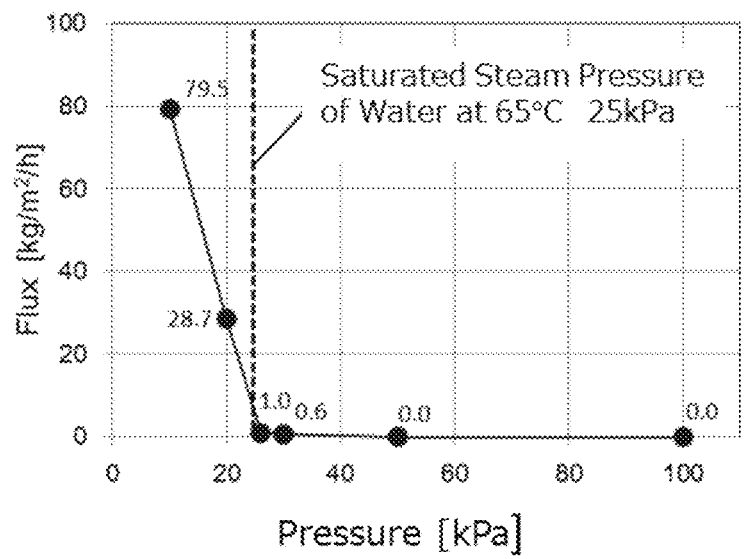
[Figure 4]
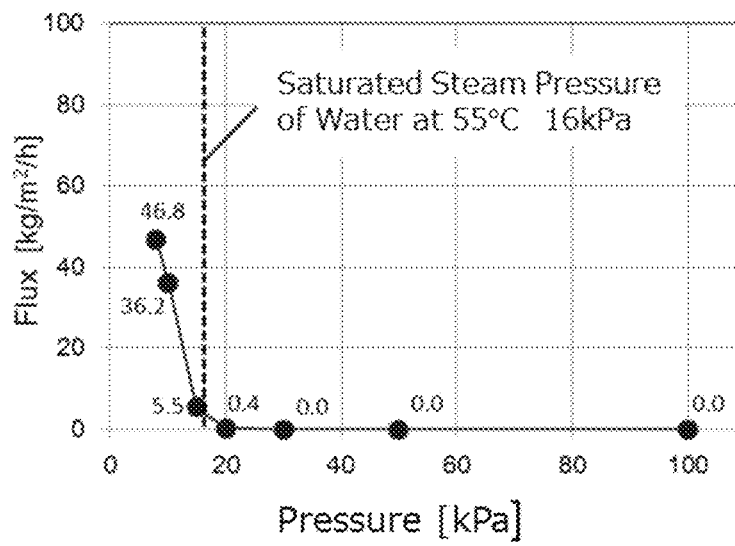

[Figure 5]
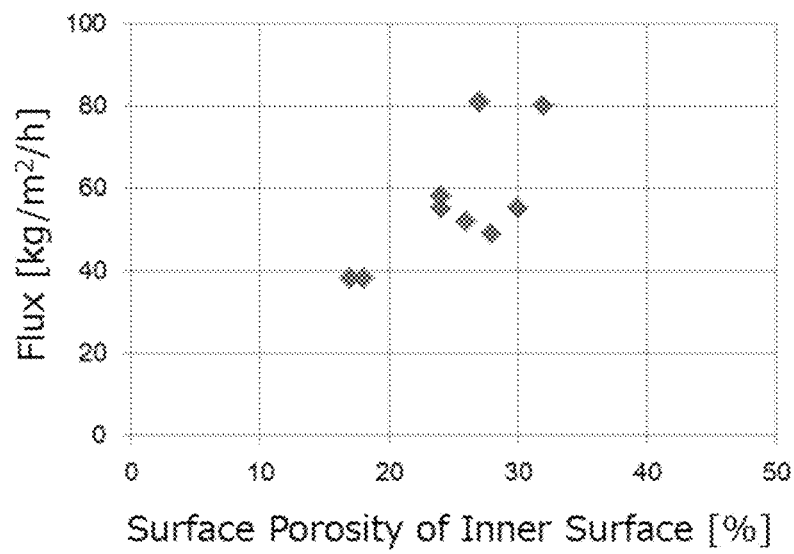
[Figure 6]
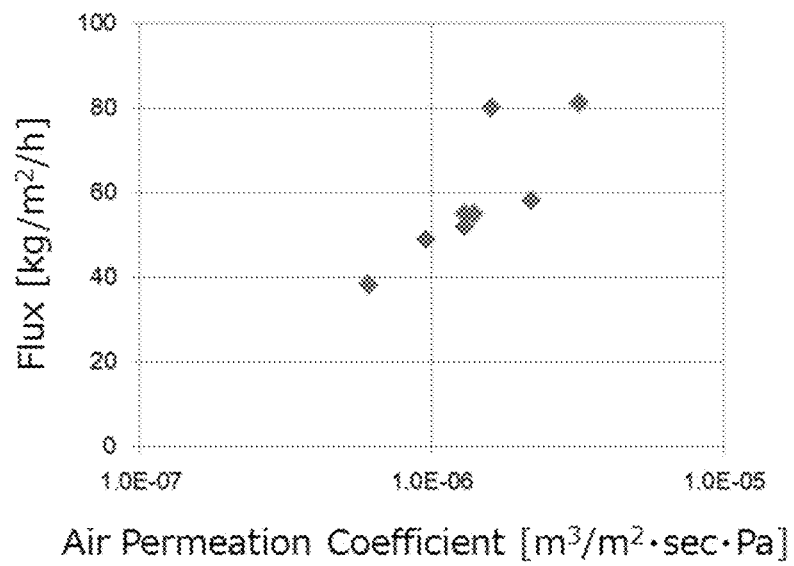

[Figure 7A]
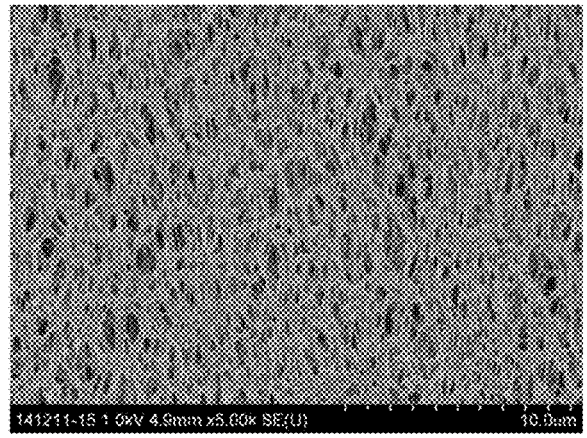
[Figure 7B]
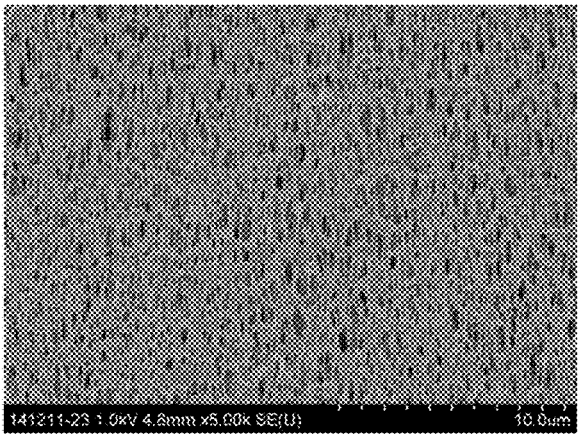
[Figure 7C]
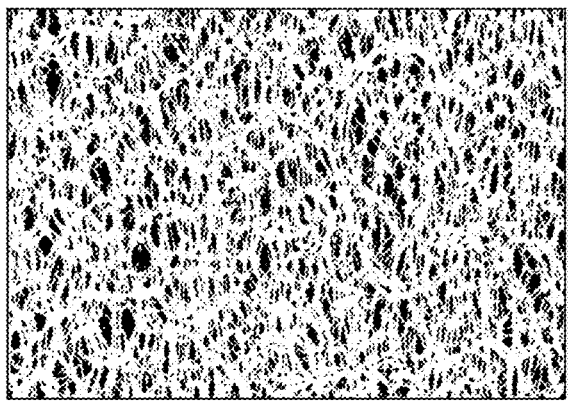
[Figure 7D]
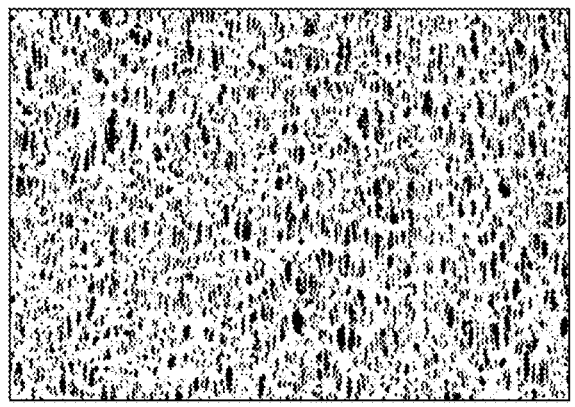
[Figure 8A]
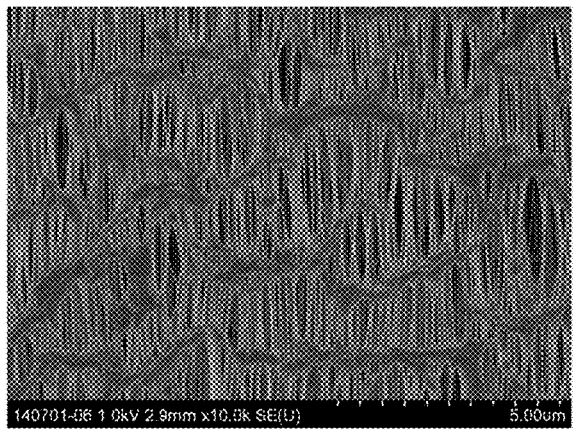
[Figure 8B]
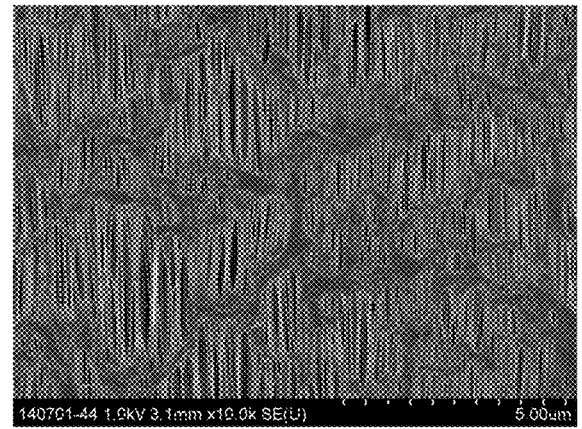

[Figure 8C] 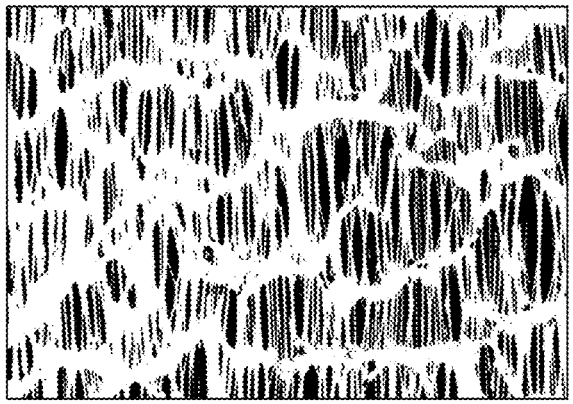
[Figure 8D] 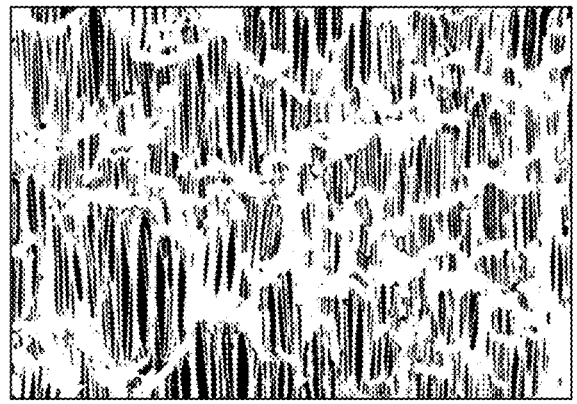
[Figure 9A] 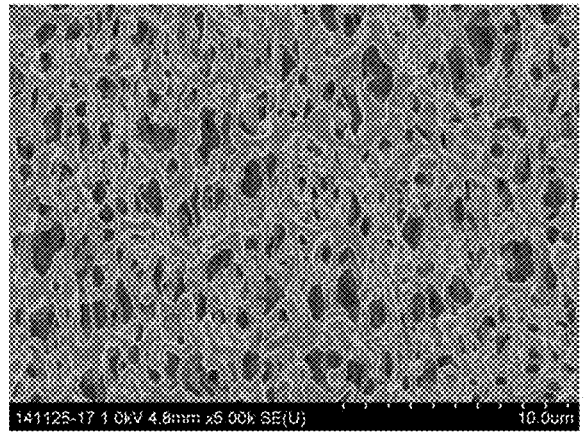
[Figure 9B] 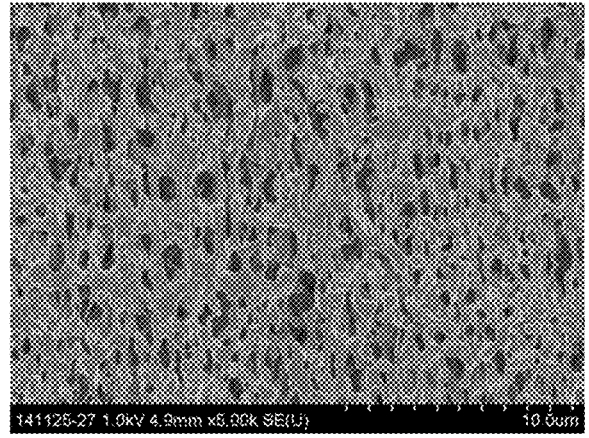
[Figure 9C] 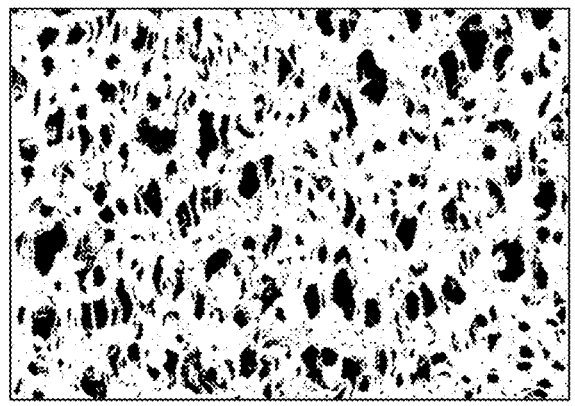
[Figure 9D] 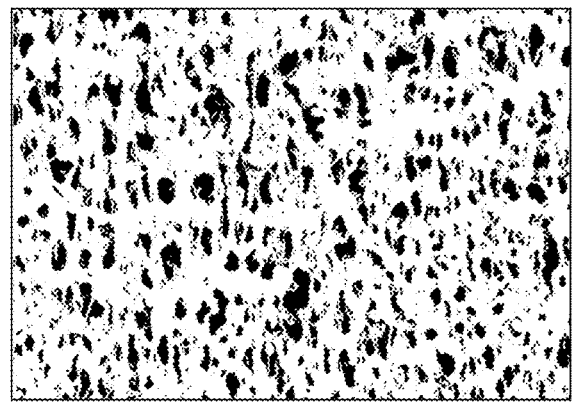

[Figure 10A]
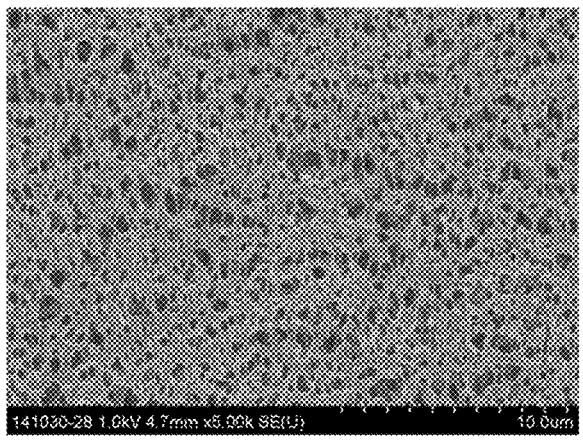
[Figure 10B]
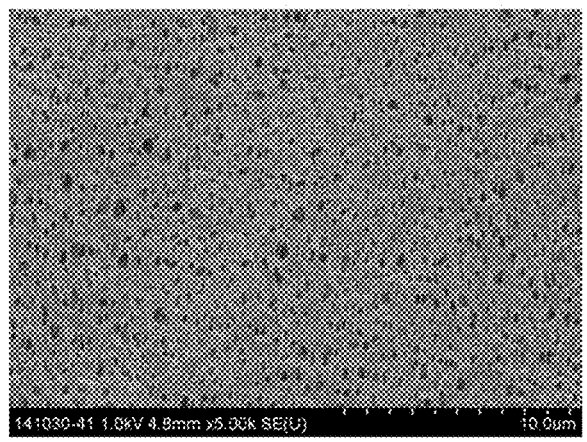
[Figure 10C]
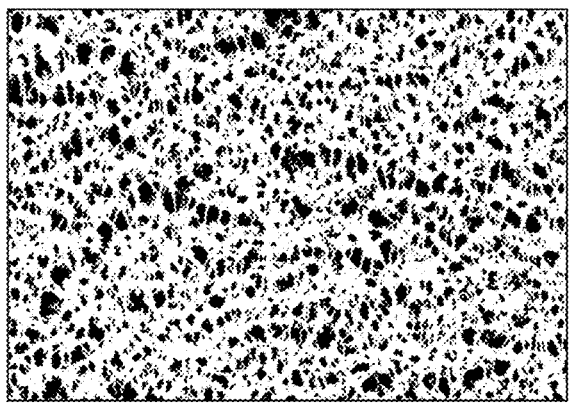
[Figure 10D]
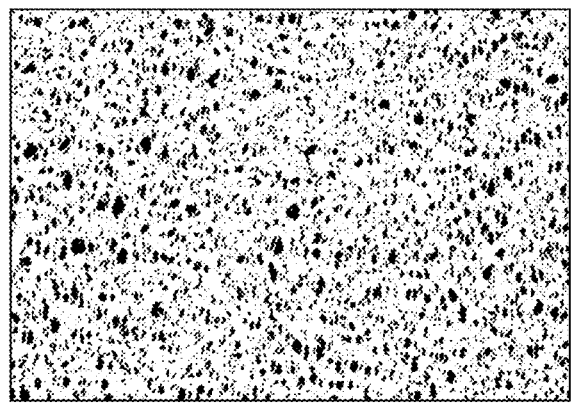
[Figure 11A]
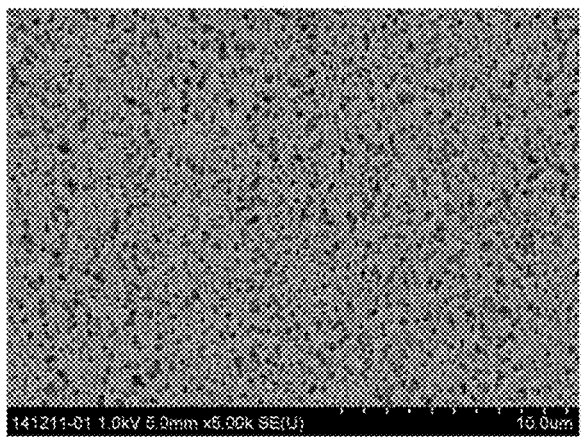
[Figure 11B]
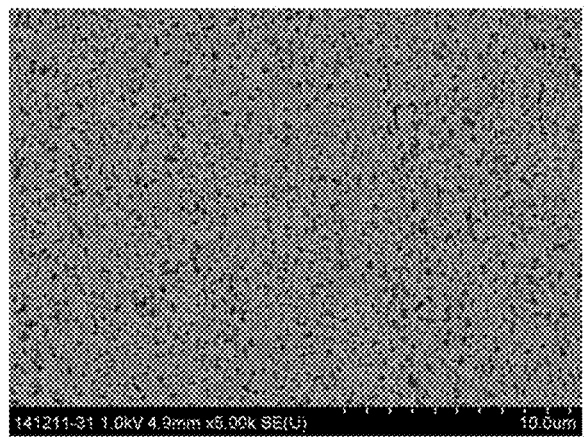

[Figure 11C]
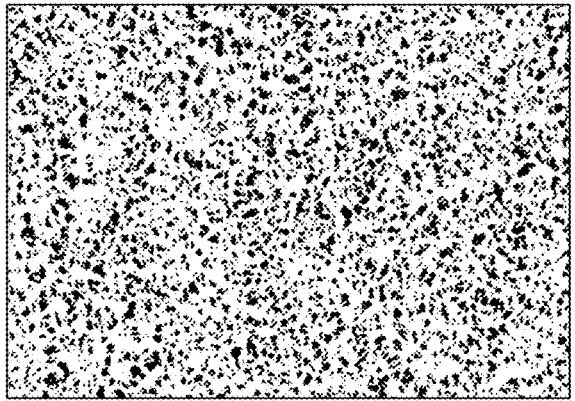
[Figure 11D]
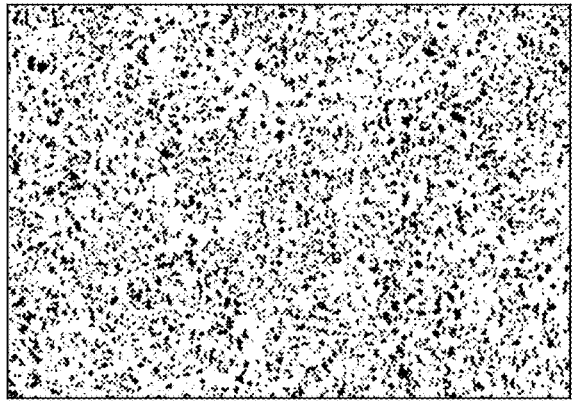
[Figure 12A]
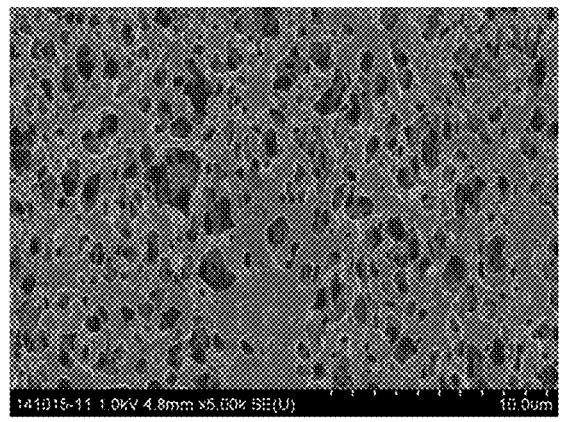
[Figure 12B]
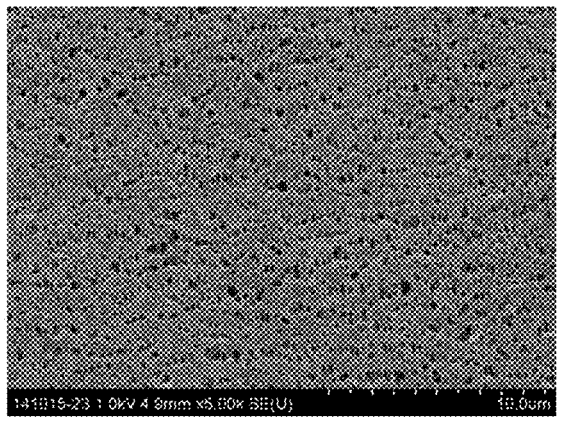
[Figure 12C]
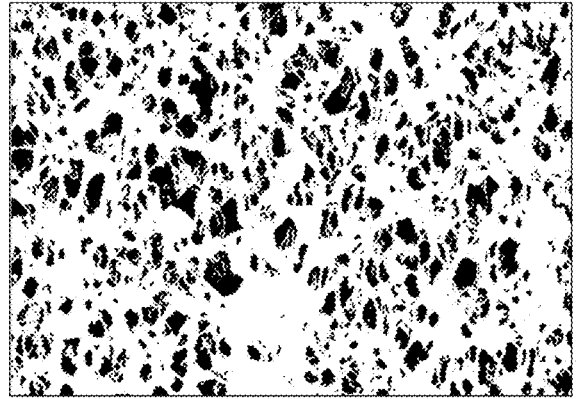
[Figure 12D]
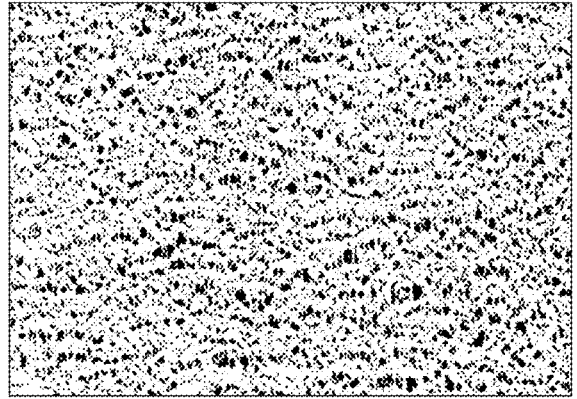

[Figure 13A]
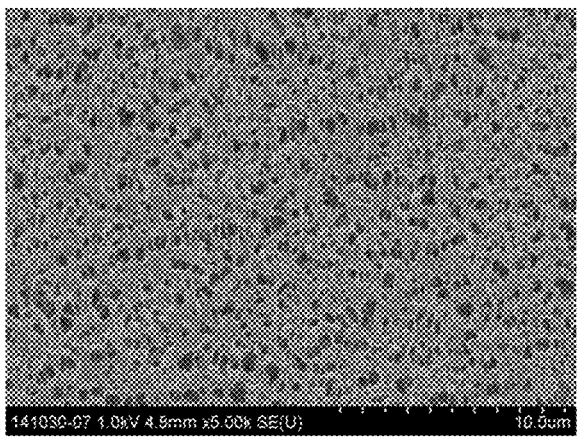
[Figure 13B]
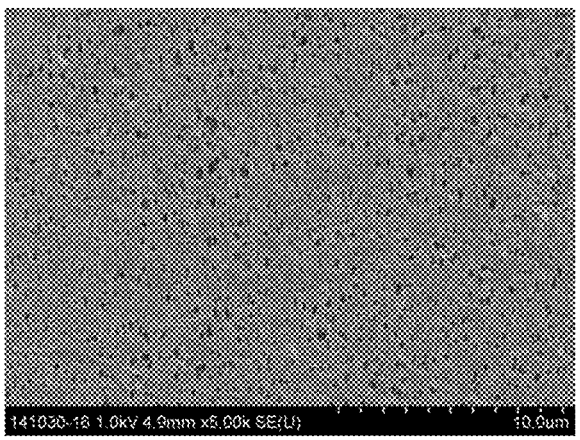
[Figure 13C]
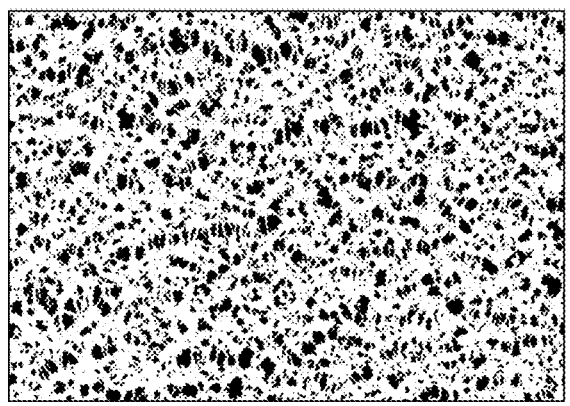
[Figure 13D]
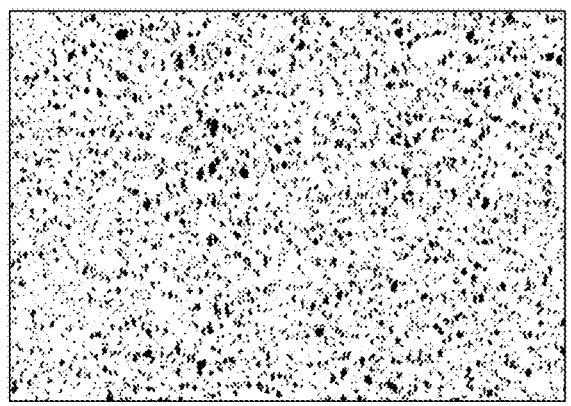
[Figure 14A]
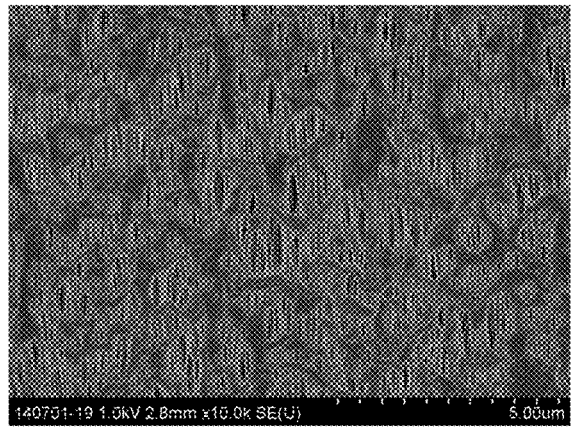
[Figure 14B]
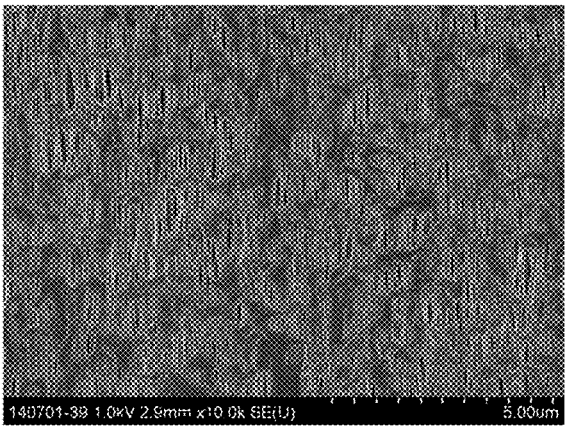

[Figure 14C]
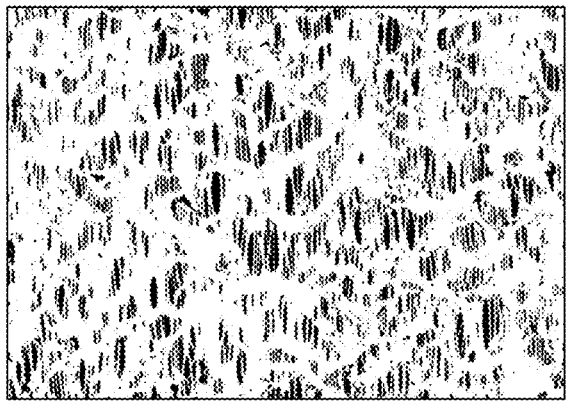
[Figure 14D]
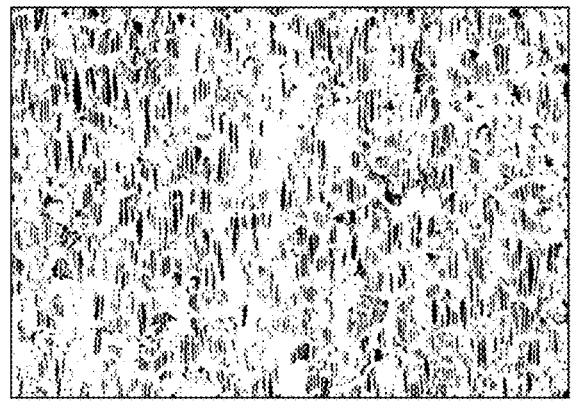
[Figure 15A]
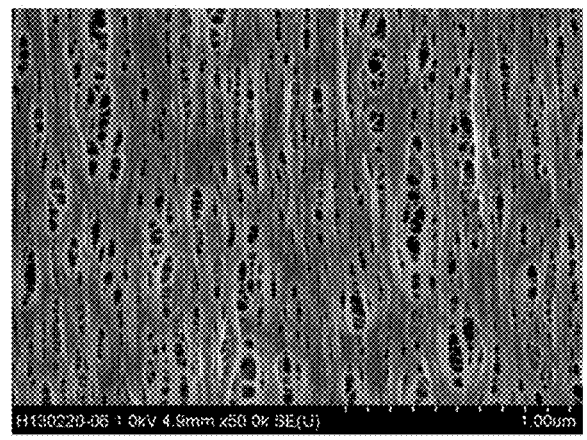
[Figure 15B]
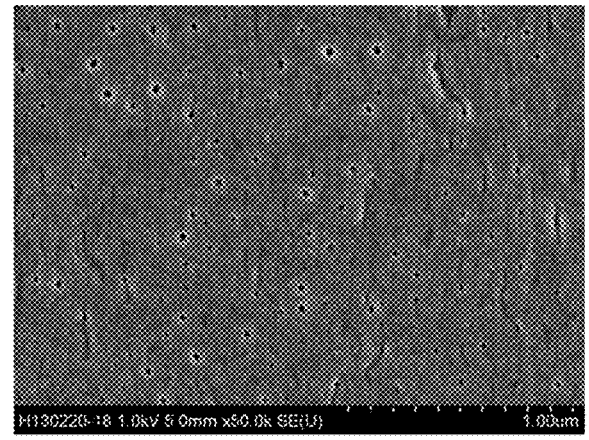
[Figure 15C]
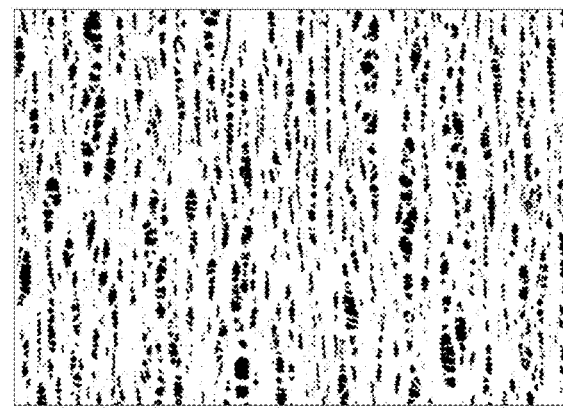
[Figure 15D]
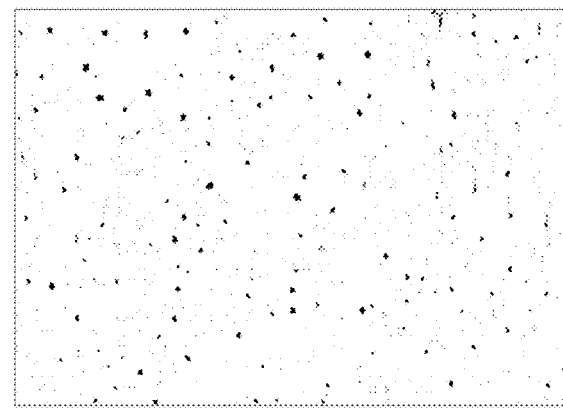

MEMBRANE DISTILLATION APPARATUS AND HYDROPHOBIC POROUS MEMBRANE

TECHNICAL FIELD

The present invention relates to a membrane distillation apparatus and a hydrophobic porous membrane.

BACKGROUND ART

A membrane distillation method is a method in which, by using a hydrophobic porous membrane which allows only steam from water to be treated to permeate therethrough, steam which has passed through the hydrophobic porous membrane is condensed from warmed raw water (high temperature water) by means of a difference in the saturated steam pressures to thereby provide distilled water. The membrane distillation method requires no high pressure and thus can reduce power energy, in comparison with the reverse osmosis method, which provides purified water by pressurizing raw water to be filtered through a reverse osmosis membrane. The membrane distillation method, which has very high performance for separation of non-volatile solutes such as salt, enables highly pure water to be provided.

The principle of a main membrane distillation method is shown in FIG. 1. In FIG. 1, (a) is the DCMD method (Direct Contact Membrane Distillation), in which steam from the high temperature water side as purified water produced through a hydrophobic porous membrane 1 is taken directly into low temperature water (referred to as cooling water in some cases). (b) is the AGMD method (Air Gap Membrane Distillation), in which an Air Gap is provided between a hydrophobic porous membrane 1 and a condenser 2, and steam from the high temperature water side is condensed onto the surface of the condenser 2 (for example, a cooling plate made of metal such as aluminum and stainless steel with excellent heat transferability) to thereby provide distilled water. (c) is the VMD method (Vacuum Membrane Distillation) in which a vacuum gap is provided on the distillation side of a hydrophobic porous membrane 1 to allow steam from the high temperature water side to migrate outside to thereby provide distilled water. (d) is the SGMD method (Sweeping Gas Membrane Distillation) in which steam from the high temperature water side to migrate outside by allowing sweeping gas to flow in the distillation side of a hydrophobic porous membrane 1 to thereby provide distilled water.

An apparatus for the DCMD method is a simple apparatus in which high-temperature water and low-temperature water flow through a membrane. In the apparatus, the migration distance of steam is equivalent to the membrane thickness and the migration resistance is also small, and thus, the amount of distilled water per unit area of the membrane (Flux) can be increased. However, it is necessary to remove distilled water produced from the low-temperature water. Furthermore, since high-temperature water and low-temperature water are in direct contact with each other via the membrane, heat loss is caused by heat exchange. Thus, the vapor difference, which is a driving force for allowing steam to migrate, is reduced, leading to a disadvantage of decrease in the heat energy efficiency required for water production.

Meanwhile, gap membrane distillation, typified by the AGMD method, tends to have large migration resistance and a reduced Flux because steam moves the air gap in addition to the membrane, but advantageously enables direct extraction of distilled water. Additionally, heat loss can be minimized because high-temperature water and low-temperature water are not in direct contact with each other via the membrane, and its high heat energy efficiency can reduce water production cost. Increasing the Flux in gap membrane distillation has been contemplated so far.

Patent Literature 1 describes, as method for gap membrane distillation, the width of a gas gap of less than 5 mm existing between a porous membrane and a condenser surface.

Patent Literature 2 mentions that reduction of the pressure of a steam diffusion layer to the saturated steam pressure of water at the raw water temperature increases the permeability coefficient of steam by 1.5 times in comparison with that at atmospheric pressure.

Membranes having a high evaporation rate and a waterproof property are required as membranes used in the membrane distillation method. Membrane structure parameters such as a pore diameter and a void ratio have been known to contribute the amount of water to be produced so far.

Patent Literature 3 mentions that increase in the nominal pore diameter and porosity of a PTFE porous membrane tube enhances the production rate of condensed water.

Patent Literature 4 describes a porous hydrophobic membrane used in the DCMD method, wherein the membrane has a membrane thickness of 50 to 1000 µm, a void ratio larger than 70%, and a pore size smaller than 2.0 µm.

Patent Literature 5 describes a hollow fiber membrane that has a high evaporation rate as well as prevents passage of seawater therethough, wherein the membrane has a porosity of 40 to 80% and a pore diameter of 0.05 to 3 µm.

Patent Literature 6 describes a porous membrane for membrane distillation in which the hydrophobicity on one side is higher than the hydrophobicity on the other side, as a membrane that increases the amount of water to be produced per unit area, but provides no quantitative description indicating the relationship between the hydrophobicity and the amount of water to be produced, and the effect is unknown.

CITATION LIST

Patent Literature

Patent Literature 1
　Japanese Patent No. 4491153
Patent Literature 2
　Japanese Patent Laid-Open No. 6-7644
Patent Literature 3
　Japanese Patent Laid-Open No. 2013-34927
Patent Literature 4
　Japanese Patent No. 5036822
Patent Literature 5
　Japanese Patent Laid-Open No. 2011-167628
Patent Literature 6
　Japanese Patent Laid-Open No. 2011-200770

SUMMARY OF INVENTION

Technical Problem

In order to increase use of the membrane distillation technology in the pure water production and water treatment fields in the future, membrane distillation apparatuses are desired which have a high water treatment capability as well as are compact in size.

A problem to be solved by the present invention is to provide a membrane distillation apparatus having a high water treatment capability as well as being compact in size. Another problem to be solved by the present invention is to provide a hydrophobic porous membrane that can be used in a membrane distillation apparatus having a high water treatment capability as well as being compact in size.

Solution to Problem

The present inventors have made extensive investigations to solve the problem described above and, as a result, have found that the Flux in a membrane distillation apparatus can be increased by adjusting the pressure of the gas phase in the membrane distillation apparatus in a predetermined range, having completed the present invention. Furthermore, the Flux in the membrane distillation apparatus can be increased to thereby enable a membrane distillation apparatus to be provided which has a high water treatment capability as well as is compact in size.

The present inventors have also reached an idea that increasing the efficiency at which high-temperature water changes its phase to steam (evaporates) through pores in the membrane outermost layer (evaporation efficiency) and the permeation rate at which the resulting steam permeates within the membrane (steam permeation rate) is important in order to increase the Flux. That is, the present inventors have conceived that the water permeating performance in membrane distillation can be improved if both the evaporation efficiency and the steam permeation rate can be increased and have made extensive investigations on the relationship between the physical properties derived from the membrane structure of the hydrophobic porous membrane and the Flux. As a result, the present inventors have found that the Flux is significantly increased in membrane distillation when a membrane having a surface porosity of the membrane surface that comes into contact with water to be treated and an air permeation coefficient of a specified value or more is used, thereby having completed the present invention.

That is, the present invention is as follows.

[1]
A membrane distillation apparatus comprising:
an evaporation part comprising a liquid phase part 1 in which water to be treated flows, a gas phase part 1, and a hydrophobic porous membrane that separates the liquid phase part 1 and the gas phase part 1,
a condensation part comprising a liquid phase part 2 in which cooling water flows, a gas phase part 2, and a cooling member that separates the liquid phase part 2 and the gas phase part 2, and
a gas phase part 3 connecting the gas phase part 1 with the gas phase part 2,
wherein the pressure of the gas phase parts 1 to 3 is 1 kPa or higher and the saturated steam pressure of water at the temperature of water to be treated or lower.

[2]
The membrane distillation apparatus according to [1], wherein the pressure of the gas phase parts 1 to 3 is 1 kPa or higher and lower than or equal to a pressure lower by at least 5 kPa than the saturated steam pressure of water at the temperature of water to be treated.

[3]
The membrane distillation apparatus according to [1], wherein the pressure of the gas phase parts 1 to 3 is 1 kPa or higher and lower than or equal to a pressure lower by at least 10 kPa than the saturated steam pressure of water at the temperature of water to be treated.

[4]
The membrane distillation apparatus according to any of [1] to [3], wherein the minimum distance between the hydrophobic porous membrane and the cooling member is 10 mm or more.

[5]
The membrane distillation apparatus according to any of [1] to [4], wherein the temperature of water to be treated is 50° C. or more.

[6]
The membrane distillation apparatus according to any of [1] to [5], wherein the hydrophobic porous membrane comprises at least one resin selected from the group consisting of polysulfone, polyethersulfone, polyethylene, polypropylene, polyvinylidene fluoride, and polytetrafluoroethylene.

[7]
The membrane distillation apparatus according to any of [1] to [6], wherein the hydrophobic porous membrane comprises a membrane surface modified by fluorine plasma treatment.

[8]
A hydrophobic porous membrane having a surface porosity of a membrane surface that comes into contact with water to be treated of 20% or more and an air permeation coefficient of $8.0 \times 10^{-7}$ m$^3$/m$^2$·sec·Pa or more.

[9]
The hydrophobic porous membrane according to [8], wherein the surface porosity of the membrane surface that comes into contact with water to be treated is 25% or more.

[10]
The hydrophobic porous membrane according to [9], wherein the surface porosity of the other membrane surface opposite to the membrane surface that comes into contact with water to be treated is 25% or more.

[11]
The hydrophobic porous membrane according to [10], wherein the surface porosity of each of the membrane surface that comes into contact with water to be treated and the other membrane surface opposite to the membrane surface is 25% or more and 70% or less.

[12]
The hydrophobic porous membrane according to [10], wherein the surface porosity of each of the membrane surface that comes into contact with water to be treated and the other membrane surface opposite to the membrane surface is 25% or more and 35% or less.

[13]
The hydrophobic porous membrane according to any of [8] to [12], wherein the air permeation coefficient is $1.2 \times 10^{-6}$ m$^3$/m$^2$·sec·Pa or more.

[14]
The hydrophobic porous membrane according to any of [8] to [12], wherein the air permeation coefficient is $1.6 \times 10^{-6}$ m$^3$/m$^2$·sec·Pa or more.

[15]
The hydrophobic porous membrane according to any of [8] to [12], wherein the air permeation coefficient is $1.6 \times 10^{-6}$ m$^3$/m$^2$·sec·Pa or more and $1.0 \times 10^{-5}$ m$^3$/m$^2$·sec·Pa or less.

[16]
The hydrophobic porous membrane according to any of [8] to [12], wherein the air permeation coefficient is $1.6 \times 10^{-6}$ m$^3$/m$^2$·sec·Pa or more and $3.2 \times 10^{-6}$ m$^3$/m$^2$·sec·Pa or less.

[17]

The hydrophobic porous membrane according to any of [8] to [16], wherein the average pore diameter is 0.20 μm or more, and the void ratio is 60% or more.

[18]

The hydrophobic porous membrane according to any of [8] to [17], wherein the hydrophobic porous membrane is a hollow fiber membrane.

[19]

A membrane distillation apparatus comprising the hydrophobic porous membrane according to any of [8] to [18].

[20]

The membrane distillation apparatus according to any of [1] to [7], wherein the hydrophobic porous membrane is the hydrophobic porous membrane according to any of [8] to [18].

Advantageous Effects of Invention

According to the present invention, a membrane distillation apparatus having a high water treatment capability as well as being compact in size can be provided. Also, a problem to be solved by the present invention is to provide a hydrophobic porous membrane that can be used in a membrane distillation apparatus having a high water treatment capability as well as being compact in size.

BRIEF DESCRIPTION OF DRAWINGS

FIG. 1 is a schematic view of a membrane distillation method, in which FIG. 1a illustrates the DCMD method (Direct Contact Membrane Distillation), FIG. 1(b) illustrates the AGMD method (Air Gap Membrane Distillation), FIG. 1(c) illustrates the VMD method (Vacuum Membrane Distillation), and FIG. 1 (d) illustrates the SGMD method (Sweeping Gas Membrane Distillation).

FIG. 2 shows a schematic view of a membrane distillation apparatus of the present invention.

FIG. 3 shows the relationship between pressure and the Flux when membrane distillation is conducted in Examples 2 and 11 and Comparative Examples 1 to 4.

FIG. 4 shows the relationship between pressure and the Flux when membrane distillation is conducted in Examples 12 to 14 and Comparative Examples 5 to 8.

FIG. 5 shows the relationship between the surface porosity of the inner surface and the Flux when membrane distillation is conducted in Examples 1 to 10.

FIG. 6 shows the relationship between air permeation coefficient and the Flux when membrane distillation is conducted in Examples 1 to 10.

FIG. 7 is electron micrographs of the hydrophobic porous hollow fiber membrane produced in Example 1 and monochrome binarized images thereof (pore portions appear black, and non-pore portions appear white), in which FIG. 7A is an electron micrograph of the inner surface, FIG. 7B is an electron micrograph of the outer surface, FIG. 7C is the monochrome binarized image of the inner surface micrograph, and FIG. 7D is the monochrome binarized image of the outer surface micrograph.

FIG. 8 is electron micrographs of the hydrophobic porous hollow fiber membrane produced in Example 2 and monochrome binarized images thereof (pore portions appear black, and non-pore portions appear white), in which FIG. 8A is an electron micrograph of the inner surface, FIG. 8B is an electron micrograph of the outer surface, FIG. 8C is the monochrome binarized image of the inner surface micrograph, and FIG. 8D is the monochrome binarized image of the outer surface micrograph.

FIG. 9 is electron micrographs of the hydrophobic porous hollow fiber membrane produced in Example 3 and monochrome binarized images thereof (pore portions appear black, and non-pore portions appear white), in which FIG. 9A is an electron micrograph of the inner surface, FIG. 9B is an electron micrograph of the outer surface, FIG. 9C is the monochrome binarized image of the inner surface micrograph, and FIG. 9D is the monochrome binarized image of the outer surface micrograph.

FIG. 10 is electron micrographs of the hydrophobic porous hollow fiber membrane produced in Example 4 and monochrome binarized images thereof (pore portions appear black, and non-pore portions appear white), in which FIG. 10A is an electron micrograph of the inner surface, FIG. 10B is an electron micrograph of the outer surface, FIG. 10C is the monochrome binarized image of the inner surface micrograph, and FIG. 10D is the monochrome binarized image of the outer surface micrograph.

FIG. 11 is electron micrographs of the hydrophobic porous hollow fiber membrane produced in Example 5 and monochrome binarized images thereof (pore portions appear black, and non-pore portions appear white), in which FIG. 11A is an electron micrograph of the inner surface, FIG. 11B is an electron micrograph of the outer surface, FIG. 11C is the monochrome binarized image of the inner surface micrograph, and FIG. 11D is the monochrome binarized image of the outer surface micrograph.

FIG. 12 is electron micrographs of the hydrophobic porous hollow fiber membrane produced in Example 6 and monochrome binarized images thereof (pore portions appear black, and non-pore portions appear white), in which FIG. 12A is an electron micrograph of the inner surface, FIG. 12B is an electron micrograph of the outer surface, FIG. 12C is the monochrome binarized image of the inner surface micrograph, and FIG. 12D is the monochrome binarized image of the outer surface micrograph.

FIG. 13 is electron micrographs of the hydrophobic porous hollow fiber membrane produced in Example 7 and monochrome binarized images thereof (pore portions appear black, and non-pore portions appear white), in which FIG. 13A is an electron micrograph of the inner surface, FIG. 13B is an electron micrograph of the outer surface, FIG. 13C is the monochrome binarized image of the inner surface micrograph, and FIG. 13D is the monochrome binarized image of the outer surface micrograph.

FIG. 14 is electron micrographs of the hydrophobic porous hollow fiber membrane produced in Example 9 and monochrome binarized images thereof (pore portions appear black, and non-pore portions appear white), in which FIG. 14A is an electron micrograph of the inner surface, FIG. 14B is an electron micrograph of the outer surface, FIG. 14C is the monochrome binarized image of the inner surface micrograph, and FIG. 14D is the monochrome binarized image of the outer surface micrograph.

FIG. 15 is electron micrographs of the hydrophobic porous hollow fiber membrane produced in Example 10 and monochrome binarized images thereof (pore portions appear black, and non-pore portions appear white), in which FIG. 15A is an electron micrograph of the inner surface, FIG. 15B is an electron micrograph of the outer surface, FIG. 15C is the monochrome binarized image of the inner surface micrograph, and FIG. 15D is the monochrome binarized image of the outer surface micrograph.

DESCRIPTION OF EMBODIMENT

Now, an embodiment for carrying out the invention (hereinafter, referred to as "the present embodiment") will be more specifically described below. Note that the present invention is not limited to the embodiment described below and modified in various ways within the scope of the present invention and carried out.

The membrane distillation apparatus of the present embodiment comprises an evaporation part comprising a liquid phase part 1 in which water to be treated flows, a gas phase part 1, and a hydrophobic porous membrane that separates the liquid phase part 1 and the gas phase part 1, a condensation part comprising a liquid phase part 2 in which cooling water flows, a gas phase part 2, and a cooling member that separates the liquid phase part 2 and the gas phase part 2, and a gas phase part 3 connecting the gas phase part 1 with the gas phase part 2, wherein the pressure of the gas phase parts 1 to 3 is 1 kPa or higher and the saturated steam pressure of water at the temperature of water to be treated or lower.

The membrane distillation apparatus according to the present embodiment comprises the evaporation part, the condensation part, and the gas phase part 3.

The evaporation part has a hydrophobic porous membrane. The hydrophobic porous membrane separates the liquid phase part 1 and the gas phase part 1, and the hydrophobic porous membrane has a membrane surface that comes into contact with the liquid phase part 1 and a membrane surface that comes into contact with the gas phase part 1. Water to be treated flows in the liquid phase part 1, and thus, the membrane surface of the hydrophobic porous membrane in contact with the liquid phase part 1 is the membrane surface that comes into contact with water to be treated, and the membrane surface of the hydrophobic porous membrane that comes into contact with the gas phase part 1 is the other membrane surface of the inner surface that comes into contact with water to be treated.

The hydrophobic porous membrane is not particularly limited as long as the membrane is a porous membrane produced in accordance with a conventionally known method and composed of a hydrophobic polymer as a main component.

Examples of the hydrophobic polymer include polymers having a low affinity with water, such as polysulfone, polyethersulfone, polyethylene, polypropylene, polyvinylidene fluoride, and polytetrafluoroethylene.

A hydrophobic polymer as a main component means that the content of the polymer is 90% by mass or more in components constituting the hydrophobic porous membrane. From the viewpoint of membrane strength, the content is preferably 95% by mass or more, more preferably 99% by mass or more.

Examples of the shape of the hydrophobic porous membrane include flat membrane types, tube-shaped types, hollow fiber types and spiral types. From the viewpoint of allowing a membrane module to be compact in size, hollow fiber membranes, which have a large membrane area per unit volume, are preferred.

A case in which a hydrophobic porous hollow fiber membrane is used as the hydrophobic porous membrane provided in the evaporation part will be illustrated.

The evaporation part is formed, for example, by bundling hydrophobic porous hollow fiber membranes, accommodating the bundled membranes into a cylindrical resin or metal container, filling the gap between the hollow fibers and the gap between the hollow fibers and the container with a fixing resin (potting resin) at the ends of the hollow fibers to fix the hollow fibers in the container. The ends of the hollow fiber membranes are open, and a head port having a water passing port is fitted each at the top end and the bottom end of the container. Connecting ports to connect with the condensation part are provided on the side of the container. The number of the connecting ports is not particularly limited, and a single connecting port or a plurality of the ports may be used.

The hollow lumens of the hydrophobic porous hollow fiber membranes form the liquid phase part 1 in which water to be treated flows. The outer membrane side of the hydrophobic porous hollow fiber membranes forms the gas phase part 1 in the container constituting the evaporation part.

Water to be treated that has passed through the hollow lumens of the hydrophobic porous hollow fiber membranes passes through the membrane walls of the hydrophobic porous hollow fiber membranes as steam to thereby migrate to the gas phase part 1. Meanwhile, nonvolatile solutes such as salt, which cannot migrate through the membrane walls, are separated by the hydrophobic porous hollow fiber membranes.

In the hydrophobic porous hollow fiber membranes, water to be treated flows through their hollow lumens. Thus, the inner surface of the hydrophobic porous hollow fiber membranes forms the surface that comes into contact with water to be treated, and the outer surface of the hydrophobic porous hollow fiber membrane forms the other membrane surface of the inner surface that comes into contact with water to be treated.

Examples of the method for producing a hydrophobic porous membrane that can be suitably used include the thermally induced phase separation method in which phase separation is induced by cooling to thereby form a porous layer, and the dry-wet method (non-solvent phase separation method) in which phase separation is induced by contact with a poor solvent to thereby form a porous layer.

In the present embodiment, the thermally induced phase separation method means the following method.

A hydrophobic polymer and a latent solvent, which is a non-solvent of the hydrophobic polymer around room temperature but becomes a solvent at higher temperatures, are mixed under heating at a high temperature (the soluble temperature of both or more) until melted. Thereafter, the solution is cooled not more than the solidification temperature of the hydrophobic polymer to cause phase separation into a polymer-rich phase and a polymer-lean phase (solvent-rich phase) by use of decrease in the dissolving power of the latent solvent to the hydrophobic polymer in the cooling process. Then, the latent solvent is extracted off to thereby provide a porous membrane composed of the solidified product of the polymer-rich phase formed in the phase separation.

Extracting the latent solvent off enables the resulting membrane to be a porous membrane, also regulating the surface porosity of the membrane surface and the air permeation coefficient in the resulting hydrophobic porous membrane.

A method in which an inorganic filler is added in addition to a hydrophobic polymer and a latent solvent and mixed under heating and the inorganic filler is extracted off together with the latent solvent in the extraction step after cooling and solidification to thereby provide a porous membrane can be used as one type of the thermally induced phase separation method.

When an inorganic filler is used, the inorganic filler has a function as a carrier for retaining the melt composed of the hydrophobic polymer and the latent solvent, and also has a function as the nuclei of microphase separation.

When the hydrophobic polymer is, for example, polyethylene, polypropylene, and polyvinylidene fluoride, examples of the latent solvent include phthalate esters such as dibutyl phthalate, dihexyl phthalate, dioctyl phthalate, di(2-ethylhexyl) phthalate, isodecyl phthalate and mixed solvents thereof.

When hydrophobic polymer is, for example, polysulfone and polyethersulfone, examples of the latent solvent include 2-(benzyloxy)ethanol, dimethyl sulfoxide, trimethyl trimellitate, N-methylbenzene sulfonic acid amide, benzyl alcohol, and mixed solvents thereof.

An example of the suitable method of providing a hydrophobic porous hollow fiber membrane by using the thermally induced phase separation method is a method including mixing a hydrophobic polymer, which is a membrane material polymer, and its latent solvent (an inorganic filler as required) under heating by using an extruder or the like until melted, extruding the melt through a spinneret for forming hollow fiber (a nozzle having a circular ring hole to extrude heated mixture in its extrusion face and a round hole to inject a hollow part forming fluid inside the circular ring hole) in a hollow shape with injection of a hollow part forming fluid into the hollow part, cooling the extrudate until solidified, and then extracting the latent solvent (and the inorganic filler) off.

The hollow part forming fluid is injected into the hollow part so that the hollow part of a hollow fiber-like extrudate does not collapse during cooling and solidification, and gas or liquid that is substantially inactive (without causing any chemical change) to the melted extrudate is used as a hollow part forming fluid. Cooling and solidification after extrusion can be performed by air cooling, liquid cooling or the combination thereof.

Examples of the substantially inactive gas or liquid to the extrudate include nitrogen gas, air, and liquids having a high boiling point.

Extraction of the latent solvent and, as required, the inorganic filler is performed using a volatile liquid or aqueous solution that is substantially inert to the cooled and solidified product and superior in dissolving power for the latent solvent and the inorganic filler.

Examples of the volatile liquid or aqueous solution used for extraction of the latent solvent include alcohols and methylene chloride.

Examples of the volatile liquid or aqueous solution used for extraction of the inorganic filler include alkaline aqueous solutions such as sodium hydroxide aqueous solution.

As the inorganic filler, hydrophobic silica can be suitably used.

Hydrophobic silica can be produced by chemically treating hydrophilic silica with a treatment agent such as silane or siloxane. Hydrophobic silica has a low hygroscopicity and excellent dispersibility.

Above all, a hydrophobic silica having an average primary particle diameter of 0.005 µm or more and 0.5 µm or less and a specific surface area of 30 m$^2$/g or more and 500 m$^2$/g or less is preferred.

Hydrophobic silica exhibits satisfactory dispersibility when mixed under heating, and thus, structural defects are unlikely to occur in a resulting membrane to be provided. Additionally, hydrophobic silica can be easily extracted off with alkaline aqueous solution. Hydrophobic silica, which has excellent dispersibility and is unlikely to aggregate, tends to form a three-dimensional network structure suitable in terms of the air permeation coefficient.

In the thermally induced phase separation method, a porous membrane is provided by cooling a spinning dope melted at a high temperature to room temperature to induce phase separation. Adjustment of the cooling rate when phase separation is induced enables adjustment of the average pore diameter.

When the cooling rate is high, that is, the aerial running distance from the spinneret to the cooling bath is short, or the spinning speed is high, the pore diameter becomes smaller. Conversely, when the cooling rate is low, that is, the aerial running distance is long, or the spinning speed is low, the pore diameter becomes larger.

A preferable composition of a spinning dope in the thermally induced phase separation method comprises, for example, 15 parts by mass or more and 50 parts by mass or less of a hydrophobic polymer, 10 parts by mass or more and 70 parts by mass or less of a latent solvent, and, as required, 5 parts by mass or more and 40 parts by mass or less of an inorganic filler.

When the proportion of the inorganic filler is 5 parts by mass or more, a suitable three-dimensional network structure can be formed in terms of the air permeation coefficient. When the proportion is 40 parts by mass or less, stable spinning can be made.

When the concentration of the hydrophobic polymer in the spinning dope is 15 parts by mass or more, it is possible to provide a hydrophobic porous hollow fiber membrane having a high void ratio and sufficient strength. When the concentration of the hydrophobic polymer in the spinning dope is 50 parts by mass or less, it is possible to provide a hydrophobic porous hollow fiber membrane having a high void ratio and excellent water permeating performance.

Alternatively, a hydrophobic porous hollow fiber membrane produced by utilizing the thermally induced phase separation method may be drawn in the longitudinal direction of the hollow fiber.

Drawing operation is conducted after cooling and solidification and before or after extraction of the latent solvent (and/or an inorganic filler). The extension of the hollow fiber by drawing is preferably conducted in the appropriate range, such that the effect of the achieved open porosity such as a void ratio and an average pore diameter is developed as well as the membrane structure are not broken.

In the present embodiment, the non-solvent phase separation method means the following method.

A porous membrane is obtained by bringing a spinning dope comprising a hydrophobic polymer and a solvent (an additive as required) into contact with a poor solvent to allow the hydrophobic polymer to be subjected to phase separation and desolvation (solvent displacement).

When the hydrophobic polymer is polysulfone, polyethersulfone, polyvinylidene fluoride, and the like, a hydrophobic porous membrane can be produced by the non-solvent phase separation method.

A preferable composition of the spinning dope in the non-solvent phase separation method comprises, for example, 10 parts by mass or more and 20 parts by mass or less of a hydrophobic polymer, 60 parts by mass or more and 85 parts by mass or less of a solvent, and, as required, 5 parts by mass or more and 20 parts by mass or less of an additive.

A concentration of the hydrophobic polymer of 10 parts by mass or more and 20 parts by mass or less is preferred from the aspects of the balance between the water permeating performance and the strength of the resulting hydrophobic porous membrane and the stability of the spinning operation. When the concentration of the additive is 5 parts by mass or more, the effect of the additive can be sufficiently exerted. When the concentration is 20 parts by mass or less, stable spinning can be made.

Examples of the solvent include N-methyl-2-pyrrolidone and N,N-dimethylacetamide.

Examples of the poor solvent include non-solvents such as water. As the poor solvent, a solvent mixture of a non-solvent and a solvent used for the spinning dope may be used.

In the solvent mixture of a non-solvent and a solvent, a higher concentration of the solvent facilitates phase separation to thereby increase the pore diameter.

In the non-solvent phase separation method, the porous structure and membrane properties of the hydrophobic porous membrane can be varied by varying the composition of the spinning dope. For example, when a spinning dope having a high concentration of the hydrophobic polymer is used, the density of the hydrophobic polymer in the resulting hydrophobic porous hollow fiber membrane can be increased and the membrane strength (tensile strength) can be improved. When a spinning dope having a low concentration of the hydrophobic polymer, the density of the hydrophobic polymer in the resulting hydrophobic porous membrane tends to be reduced and the pore diameter tends to be increased, and thus, the void ratio and the air permeation coefficient can be increased.

Additionally, a longer aerial running distance from the spinneret from the coagulation liquid containing a poor solvent facilitates phase separation to thereby increase the pore diameter.

A hydrophilic additive may be used for the purpose of adjusting the dope viscosity of the spinning dope within a proper range and stabilizing the membrane-forming status as well as adjusting the phase separation rate. Use of an additive enables the membrane structure and membrane properties of the hydrophobic porous membrane to be adjusted. Above all, use of a spinning dope having a high concentration of a hydrophilic additive increases the pore diameter.

Examples of the additive include polyvinylpyrrolidone, ethylene glycol, triethylene glycol, and tetraethylene glycol.

The hydrophobic porous membrane of the present embodiment has a surface porosity of the membrane surface that comes into contact with water to be treated of 20% or more and an air permeation coefficient of $8.0 \times 10^{-7}$ $m^3/m^2 \cdot sec \cdot Pa$ or more.

Use of a membrane having a surface porosity of the membrane surface that comes into contact with water to be treated and an air permeation coefficient that are not less than a specified value described above can increase both the evaporation efficiency and the steam permeation rate, and thus, the hydrophobic porous membrane can have a significantly increased Flux. It is believed that a high surface porosity of the membrane surface that comes into contact with water to be treated leads to increase in the evaporation efficiency. It is also believed that a high air permeation coefficient leads to increase in the steam permeation rate.

In the present embodiment, from the viewpoint of the water permeating performance in membrane distillation, the surface porosity of the membrane surface that comes into contact with water to be treated of the hydrophobic porous membrane is 20% or more, preferably 25% or more. From the viewpoint of the mechanical strength of the membrane and the viewpoint of leakage prevention in use under reduced pressure, the surface porosity of the membrane surface that comes into contact with water to be treated of the hydrophobic porous membrane is preferably 70% or less, more preferably 35% or less.

The surface porosity of the membrane surface that comes into contact with water to be treated of the hydrophobic porous membrane is suitably 20% or more and 70% or less, and may be 25% or more or may be 35% or less within the range. In one aspect, the surface porosity of the membrane surface that comes into contact with water to be treated is suitably 25% or more and 35% or less.

In the present embodiment, the surface porosity of the membrane surface that comes into contact with water to be treated of the hydrophobic porous membrane can be measured by analyzing the image of an electron micrograph with image analysis processing software in reference to the method described in Examples.

In the present embodiment, from the viewpoint of the water permeating performance in membrane distillation, the surface porosity of the other membrane surface opposite to the membrane surface that comes into contact with water to be treated of the hydrophobic porous membrane is preferably 20% or more, more preferably 25% or more.

It is believed that the membrane suitably has an entirely coarse and homogeneous structure in order to increase the steam permeation rate. When the surface porosity of the other membrane surface opposite to the membrane surface that comes into contact with water to be treated approximates to the surface porosity of the membrane surface that comes into contact with water to be treated, it is believed that the entire membrane structure becomes homogeneous. Thus, it is suitable for the other membrane surface opposite to the membrane surface that comes into contact with water to be treated to have a high surface porosity from the viewpoint of the steam permeation rate, above all. Specifically, in addition that the surface porosity of the membrane surface that comes into contact with water to be treated of the hydrophobic porous membrane is 20% or more, the surface porosity of the other membrane surface opposite to the membrane surface that comes into contact with water to be treated of the hydrophobic porous membrane is preferably 20% or more.

From the viewpoint of the mechanical strength of the membrane and the viewpoint of leakage prevention in use under reduced pressure, the surface porosity of the other membrane surface opposite to the membrane surface that comes into contact with water to be treated of the hydrophobic porous membrane is preferably 70% or less, more preferably 35% or less.

The surface porosity of the other membrane surface opposite to the membrane surface that comes into contact with water to be treated of the hydrophobic porous membrane is suitably 20% or more and 70% or less, and may be 25% or more or may be 35% or less within the range. In one aspect, the surface porosity of the other membrane surface opposite to the membrane surface that comes into contact with water to be treated is suitably 25% or more and 35% or less. Additionally, both the surface porosity of the membrane surface that comes into contact with water to be treated and the surface porosity of the other membrane surface opposite to the membrane surface of the hydrophobic porous membrane are suitably 25% or more, above all, preferably 25% or more and 70% or less, more preferably 25% or more and 35% or less.

In the present embodiment, the surface porosity of the other membrane surface opposite to the membrane surface that comes into contact with water to be treated of the hydrophobic porous membrane can be measured by analyzing the image of an electron micrograph with image analysis processing software in reference to the method described in Examples.

In the present embodiment, from the viewpoint of the water permeating performance in membrane distillation, the air permeation coefficient of the hydrophobic porous membrane is $8.0 \times 10^{-7}$ m³/m²·sec·Pa or more, preferably $1.2 \times 10^{-6}$ m³/m²·sec·Pa or more, more preferably $1.6 \times 10^{-6}$ m³/m²·sec·Pa or more. From the viewpoint of the mechanical strength of the membrane and the viewpoint of leakage prevention in use under reduced pressure, the air permeation coefficient of the hydrophobic porous membrane is preferably $1.0 \times 10^{-5}$ m³/m²·sec·Pa or less, more preferably $3.2 \times 10^{-6}$ m³/m²·sec·Pa or less. The air permeation coefficient of the hydrophobic porous membrane of the hydrophobic porous membrane is suitably $8.0 \times 10^{-7}$ m³/m²·sec·Pa or more and $1.0 \times 10^{-5}$ m³/m²·sec·Pa or less, and, within the range, preferably $1.2 \times 10^{-6}$ m³/m²·sec·Pa or more, more preferably $1.6 \times 10^{-6}$ m³/m²·sec·Pa or more, and also preferably $1.0 \times 10^{-5}$ m³/m²·sec·Pa or less, more preferably $3.2 \times 10^{-6}$ m³/m²·sec·Pa or less. Above all, the air permeation coefficient of the hydrophobic porous membrane of the hydrophobic porous membrane is preferably $1.6 \times 10^{-6}$ m³/m²·sec·Pa or more and $1.0 \times 10^{-5}$ m³/m²·sec·Pa or less, more preferably $1.6 \times 10^{-6}$ m³/m²·sec·Pa or more and $3.2 \times 10^{-6}$ m³/m²·sec·Pa or less.

In the present embodiment, the air permeation coefficient of the hydrophobic porous membrane can be determined by pressurizing the other membrane surface opposite to the membrane surface that comes into contact with water to be treated of hydrophobic porous membrane with air at a specified pressure and measuring the amount of air permeated through the membrane surface that comes into contact with water to be treated using a soap-film flow meter, in reference to the method described in Examples.

The hydrophobic porous membrane of the present embodiment preferably has an average pore diameter of 0.20 μm or more and a void ratio of 60% or more, from the viewpoint of the water permeating performance in membrane distillation.

In the present embodiment, from the viewpoint of the water permeating performance in membrane distillation, the average pore diameter of the hydrophobic porous membrane is preferably 0.20 μm or more, more preferably 0.50 μm or more.

From the viewpoint of preventing the wetting phenomenon, which is water ingress into the membrane due to decrease in the water repellency of the membrane surface, the average pore diameter of the hydrophobic porous membrane is preferably 10 μm or less.

In the present embodiment, the average pore diameter of the hydrophobic porous membrane can be measured in accordance with the method for measuring the average pore diameter described in ASTM: F316-86, in reference to the method described in Examples.

In the present embodiment, from the viewpoint of the water permeating performance in membrane distillation, the void ratio of the hydrophobic porous membrane is preferably 60% or more, more preferably 70% or more.

From the viewpoint of the mechanical strength of the membrane and the viewpoint of leakage prevention in use under reduced pressure, the void ratio of the hydrophobic porous membrane is preferably 90% or less.

In the present embodiment, the void ratio of the hydrophobic porous membrane can be measured in reference to the method described in Examples.

In the present embodiment, from the viewpoint of the water permeating performance in membrane distillation and the mechanical strength of the membrane, the membrane thickness of the hydrophobic porous membrane is preferably 10 μm to 500 μm, more preferably 15 μm to 300 μm, still more preferably 20 μm to 150 μm.

A membrane thickness of 500 μm or less can prevent the water permeating performance from being reduced.

A membrane thickness of 10 μm or more can prevent deformation of the membrane in use under reduced pressure and a blockage of fluid passages.

In the present embodiment, the membrane thickness of the hydrophobic porous membrane can be measured from a micrograph of the cross section in reference to the method described in Examples.

The membrane surface of the hydrophobic porous membrane may be modified by surface treatment such as fluorine plasma treatment.

When pores in the membrane surface of the hydrophobic porous membrane are moistened, problems may often occur, such as reduction in the water permeating performance and water leakage due to decrease in the effective evaporation area. Such performance reduction can be prevented by modifying the membrane surface to increase the water repellency. To increase the water repellency, fluorine plasma treatment on the hydrophobic porous membrane may be performed. Such fluorine plasma treatment can be easily performed by a plasma generator using $CF_4$ as process gas.

In the present embodiment, water to be treated is water that requires to be purified or concentrated for some purposes. Examples include tap water, industrial water, river water, well water, lake water, sea water, industrial wastewater (wastewater from plants such as food plants, chemical plants, electronics industrial plants, pharmaceutical plants, and garbage disposal facilities) and produced water discharged on production of petroleum and natural gas.

Water to be treated has a water temperature (temperature of water to be treated) of preferably 50° C. or more, more preferably 80° C. or more, from the viewpoint of the water permeating performance.

The water temperature of water to be treated (temperature of water to be treated) may be controlled by use of a heat source such as a heat exchanger or a heater. Controlling the temperature by application of solar heat or by use of exhaust heat from industrial processes and the like is preferable because heat energy costs required for heating can be eliminated or reduced.

In the present embodiment, the condensation part is formed by, for example, accommodating cooling members into a cylindrical resin or metal container, filling the gap between the cooling members and the gap between the cooling members and the container with a fixing resin (potting resin) at the ends of the cooling members to thereby fix the cooling members in the container. The ends of the cooling member are open, and a head port having a water passing port is fitted each at the top end and the bottom end of the container. Connecting ports to connect with the evaporation part are provided on the side of the container. The number of the connecting ports are not particularly limited, and a single connecting port or a plurality of ports may be used.

The shape of the cooling member may be a hollow type or a flat plate type, but hollow tubes can be suitably used.

The cooling member is provided inside the condensation part, and the inner region of the cooling member forms the liquid phase part 2 in which cooling water flows. The outer region of the cooling member forms the gas phase part 2 in the container that constitutes the condensation part.

Water to be treated that has flown though the liquid phase part 1 passes through the membrane walls of the hydrophobic porous membrane as steam to thereby migrate to the gas phase part 1. The water is cooled by the cooling member in the gas phase part 2 to be distilled water.

The condensation part having the cooling member is connected to a water collecting container via piping, and distilled water is discharged from the condensation part and collected into the water collecting container.

In the present embodiment, cooling water flows in the liquid phase part 2, which is the inner space of the cooling member, and is not particularly limited as long as the liquid can cool steam. Examples include tap water, industrial water, river water, well water, lake water, sea water, industrial wastewater (wastewater from plants such as food plants, chemical plants, electronics industrial plants, pharmaceutical plants, and garbage disposal facilities) and produced water discharged on production of petroleum and natural gas. In the present embodiment, water used as water to be treated may be used as cooling water.

Cooling water has a water temperature of preferably 30° C. or less, more preferably 20° C. or less, from the viewpoint of condensation efficiency.

The water temperature of the cooling water may be controlled by use of a heat source such as a heat exchanger and a heater.

In the present embodiment, the membrane distillation apparatus preferably comprises the evaporation part and the condensation part as containers separated from each other, and comprises the gas phase part 3 so as to connects the evaporation part with the condensation part, but may be an integrated membrane distillation apparatus comprising the evaporation part and the condensation part in the same container. In the case of an integrated membrane distillation apparatus, the region of the gas phase parts 1 to 3 is not strictly defined, but it is conceivable that the integrated gas phase part is composed of the gas phase parts 1 to 3.

The gas phase part 3 is connected with a connecting port that connects the gas phase part 1 with the gas phase part 2. The capacity of the gas phase part 3 is preferably large from the viewpoint of steam permeation. The number of the connecting port is not particularly limited, and a single connecting port or a plurality of ports may be used. The shape of the connecting part may be cylindrical or rectangular. As the material of the connecting part, which is not particularly limited, resins and metals may be utilized. To prevent steam from condensing in the connecting part, a high heat insulating material may be utilized, and heat insulation processing may be provided as required. In the case of an integrated membrane distillation apparatus, the entire gas phase part, which can be said to be the gas phase parts 1 to 3, preferably has a large capacity.

The gas phase part 3 is suitably installed such that the minimum distance between the hydrophobic porous membrane of the evaporation part and the cooling member of the condensation part is 10 mm or more. In the present embodiment, allowing the pressure of the gas phase part to fall within the predetermined range reduces the limitation on the arrangement distance between the evaporation part and the condensation part in the membrane distillation apparatus and facilitates the design of the membrane modules employing a hydrophobic porous membrane, enabling a membrane distillation apparatus to be provided by which space-saving and downsizing of the pure water supplying system can be achieved.

The minimum distance between the hydrophobic porous membrane and the cooling member herein means the nearest distance between the outer circumference parts of each of the hydrophobic porous membrane and the cooling member as the straight-line distance.

Allowing the minimum distance to be 10 mm or more can facilitate the design of the evaporation part and the condensation part, and the minimum distance may be 30 mm or more.

In the present embodiment, allowing the minimum distance to be 10 mm or more can facilitate the design of the evaporation part and the condensation part. When membrane distillation is conducted with the pressure of the gas phase parts 1 to 3 controlled to 1 kPa or higher and the saturated steam pressure of water at the temperature of water to be treated or lower, a membrane distillation apparatus that can achieve a high Flux by use of a hydrophobic porous membrane despite requiring no high vacuum or sweep gas and being compact in size may be provided.

Above all, in the case where hollow fiber membranes are used as the hydrophobic porous membrane, it is possible to provide a membrane distillation apparatus by which space-saving and downsizing of the pure water supplying system can be achieved by allowing the pressure of the gas phase part to be within the predetermined range, even if the evaporation part does not approximate to the condensation part.

In the present embodiment, the gas phase parts 1 to 3 form a continuous space, and the pressure of the gas phase parts 1 to 3 is controlled to 1 kPa or higher and the saturated steam pressure of water at the temperature of water to be treated or lower.

The pressure of the gas phase parts 1 to 3 being the saturated steam pressure of water at the temperature of water to be treated or less means that the gas phase parts 1 to 3 are controlled to a pressure of the saturated steam pressure of water (theoretical value) at the water temperature of water to be treated (temperature of water to be treated) or less.

Allowing the pressure of the gas phase parts 1 to 3 to be 1 kPa or more can reduce the consumption energy required for pressure reduction by a pressure reducing unit, and allowing the pressure to be the saturated steam pressure of water at the temperature of water to be treated or less can achieve high water permeating performance.

From the viewpoint of consumption energy, the pressure is preferably 1 kPa or more, more preferably 10 kPa or more.

From the viewpoint of the water permeating performance, the pressure is preferably the saturated steam pressure of water at the temperature of water to be treated or less, more preferably lower than or equal to a pressure lower by at least 5 kPa than the saturated steam pressure of water at the temperature of water to be treated, still more preferably lower than or equal to a pressure lower by at least 10 kPa than the saturated steam pressure of water at the temperature of water to be treated.

Examples of the pressure reducing unit for reducing the pressure of the gas phase parts 1 to 3 in order to reduce the pressure of the gas phase parts 1 to 3 to the saturated steam pressure of water at the temperature of water to be treated or less include diaphragm vacuum pumps, dry pumps, oil rotary vacuum pumps, ejectors, and aspirators.

Examples of the method for controlling the pressure include a method employing a vacuum regulator or a leak valve, and a method employing an electronic vacuum controller and an electromagnetic valve.

The membrane distillation apparatus according to the present embodiment will be illustrated with reference to FIG. 2.

As shown in FIG. 2, the membrane distillation apparatus may comprise an evaporation part, a condensation part, and a gas phase part, and may be composed of a water collecting container, a pressure reducing unit, a pressure regulator and the like. For example, water to be treated is heated by a heat source such as a heat exchanger or a heater, and stored in a tank for water to be treated as high temperature water.

FIG. 2A illustrates the case of an integrated membrane distillation apparatus. Water to be treated is allowed to flow through a space separated by the hydrophobic porous membrane (liquid phase part 1) in the container. When the water passes through the liquid phase part 1, a portion of the water as steam passes through the hydrophobic porous membrane and migrates to the gas phase part (indicated as Air Gap). The steam is condensed over the cooling member of the condensation part because the gas phase part is controlled to 1 kPa or higher and the saturated steam pressure of water at the temperature of water to be treated or lower, by the pressure reducing unit.

In FIG. 2B, high temperature water in the tank for water to be treated is allowed to flow through the hollow lumen of the hydrophobic porous hollow fiber membranes (liquid phase part 1) in the evaporation part by a liquid feed pump. When the water to be treated passes through the hydrophobic porous hollow fiber membrane lumens, a portion of the water passes through the hydrophobic porous hollow fiber membranes as steam and migrates to the gas phase part 1. The steam passes through the gas phase part 2 and migrates to the gas phase part 3 of the condensation part because the pressure of the gas phase parts 1 to 3 is controlled to 1 kPa or higher and the saturated steam pressure of water at the temperature of water to be treated or lower, by the pressure reducing unit. The steam passed through is condensed over the cooling member of the condensation part by cooling water circulating in countercurrent in the cooling member lumens in the condensation part to thereby provide distilled water. The cooling water is allowed to flow through the cooling member by a liquid feed pump. The distilled water obtained by condensation over the cooling member is collected into the water collecting container. The pressure of the gas phase parts 1 to 3 is controlled to be constant by the pressure reducing unit.

The pressure of the gas phase parts 1 to 3 can be usually monitored with a pressure gauge. The pressure gauge is provided in the pressure regulator in the case of the membrane distillation apparatus illustrated in FIG. 2. In this case, the pressure of the gas phase parts 1 to 3 may be monitored as the total pressures of the gas phase parts 1 to 3, the water collecting container, the pressure regulator, and piping connecting therebetween.

In the present embodiment, the Flux obtained by membrane distillation may be appropriately set by the temperature of water to be treated. For example, but not limited to, in the case where the temperature of water to be treated is 65° C., the Flux is more preferably 50 kg/m²/h, more preferably 65 kg/m²/h, still more preferably 80 kg/m²/h.

The membrane distillation apparatus according to the present embodiment can be suitably used for applications to purify water to be treated by removing ions, organic substances, inorganic substances and the like contained in the water to be treated or applications to concentrate water to be treated by removing water from the water to be treated. Examples of the application include seawater desalination, ultrapure water production (semiconductor plants and the like), boiler water production (thermal power plants and the like), water treatment in fuel cell systems, industrial wastewater treatment (food plants, chemical plants, electronics industrial plants, pharmaceutical plants, garbage disposal facilities and the like), water production for dialysis, water production for injection, produced water treatment (heavy oil, shale oil, shale gas, natural gas and the like), and recovery of valuables from sea water.

The membrane distillation apparatus according to the present embodiment may be used as a combined system in combination with other water treatment technique. For example, the membrane distillation apparatus according to the present embodiment can be utilized to improve the total water recovery ratio by purifying concentrated water generated during treatment by the RO (Reverse Osmosis) method employing the RO principle, by the membrane distillation apparatus. The membrane distillation apparatus according to the present embodiment also can be utilized as a means for recovering DS (Draw Solution) used in the FO (Forward Osmosis) method employing the FO principle.

EXAMPLES

Examples and the like specifically illustrating the constitution and effect of the present invention will be descried below, but the present embodiment is not limited thereto. Incidentally, measurement methods for the hydrophobic porous hollow fiber membrane will be now described, and each measurement of the hydrophobic porous membrane can be carried out with reference to the measurement methods.

(Weight Average Molecular Weight)

The weight average molecular weight of a hydrophobic polymer was measured by the GPC method by using a GPC apparatus (HLC-8220GPC manufactured by TOSOH CORPORATION, and as columns, one KF-606M (6.0 mm ID×15 cm) manufactured by Shodex Co., Ltd. and one KF-601 (6.0 mm ID×15 cm) manufactured by Shodex Co., Ltd.). The GPC sample used was a filtrate prepared by dissolving a hydrophobic polymer in an organic solvent such as N-methylpyrrolidone or dimethylformamide at a concentration of 1.0 mg/mL and filtering the solution through a 0.45-micron filter (Chromatodisc 25N manufactured by GL Sciences Inc.). Additionally, a calibration curve was formed by using methyl methacrylate, and the weight average molecular weight of the sample was calculated in terms of methyl methacrylate.

(Outer Diameter, Inner Diameter, and Membrane Thickness)

The outer diameter and the inner diameter of a hydrophobic porous hollow fiber membrane were determined by slicing the porous hollow fiber membrane in the direction perpendicular to the longitudinal direction of the membrane with a razor or the like and measuring each of the inner diameter and the outer diameter of the cross section using a microscope. The membrane thickness (mm) was calculated by arithmetic averaging from the following expression (1) as a membrane thickness (μm).

$$\text{Membrane thickness [mm]} = \frac{\text{Outer diameter [mm]} + \text{Inner diameter [mm]}}{2} \qquad [\text{Expression 1}]$$

(Void Ratio)

The hydrophobic porous hollow fiber membrane was cut into a specified length with a razor. The weight of the hollow fiber was measured with an electronic balance, and the void ratio was calculated from the following expression (2).

$$\text{Void ratio [\%]} = \quad [\text{Expression 2}]$$

$$100 - \frac{\text{Hollow fiber weight [g]} \times 100}{\text{Polymer density [g/cm}^3] \times \left( \frac{(\text{Outer diameter [cm]}/2)^2 -}{(\text{Inner diameter [cm]}/2)^2} \right) \times 3.14 \times \text{Length [cm]}}$$

(Average Pore Diameter)

The average pore diameter was measured by the method for measuring the average pore size described in ASTM: F316-86 (alternative name: the half-dry method).

The measurement was performed on a hydrophobic hollow fiber membrane of about 10 cm long in the standard measuring condition using ethanol as liquid at 25° C. and at a pressure increasing rate of 0.01 atm/second.

The average pore diameter can be determined by the following expression:

Average pore diameter [μm]=2860×(Surface tension of the liquid used [dyne/cm])/(Half-dry air pressure [Pa]).

Since the surface tension of ethanol at 25° C. is 21.97 dyne/cm, the average pore diameter was determined by the following expression.

Average pore diameter [μm]=62834/(Half-dry air pressure [Pa])

(Surface Porosity)

The electron micrograph of the membrane surface of the hydrophobic porous hollow fiber membrane was taken by using a scanning electron microscope (S-4700 manufactured by Hitachi, Ltd.) at accelerating voltage of 1.0 kV, under secondary electron detection conditions, and at a magnification of 5,000 to 50,000. The surface porosity of each of the inner surface and the outer surface of the hydrophobic porous hollow fiber membrane was determined by processing the electron micrograph image by image analysis processing software. The image analysis processing software used for the processing was, for example, ImageJ (free software). Emphasis and filter processing was implemented such that the pore portions of the captured image appear black and the non-pore portions appear white. Thereafter, pore portions were counted. In the case where polymer chains of the lower layer can be seen inside the pore, counting was performed by taking the polymer chains as non-pore portions. The surface porosity was calculated by the following expression.

Surface porosity [%]=100×(Sum of each pore area)/(Area of the measured range)

(Area of the measured range) is (Sum of each pore area)+(Sum of each non-pore portion area). Pores on the boundary of the measured range shall not be eliminated.

(Air Permeation Coefficient)

The hydrophobic porous hollow fiber membranes were fixed on a resin container. The outside of the hollow fibers was pressurized with air at a specified pressure. The amount of air permeated through from the inside of the hollow fibers was measured by using a soap-film flow meter. The air permeation coefficient was calculated by the following expression (3).

$$\text{Air permeation coefficient[m}^3/\text{m}^2 \cdot \text{sec} \cdot \text{Pa]} = \frac{\text{Amount of air permeated [m}^3/\text{sec]}}{\text{Membrane area [m}^2] \times \text{Pressure [Pa]}} \quad [\text{Expression 3}]$$

(Flux)

Membrane distillation was conducted, and the amount of the membrane-distilled water collected obtained in the water collecting container was measured using an electron balance, and the Flux was calculated by the following expression (4).

$$\text{Flux[kg/m}^2/\text{h]} = \frac{\text{Amount of water collected [kg]}}{\text{Membrane area [m}^2] \times \text{Water collecting time [h]}} \quad [\text{Expression 4}]$$

(Water Conductivity)

The conductivity of the membrane-distilled water was measured by using a conductivity meter (EC Testr (registered trademark) 11+ manufactured by EUTECH INSTRUMENTS).

Example 1

In a Henschel mixer, 23 parts by mass of a hydrophobic silica having an average primary particle size of 0.016 μm and a specific surface area of 110 m²/g (AEROSIL-R972 manufactured by NIPPON AEROSIL CO., LTD.), 31 parts by mass of di(2-ethylhexyl) phthalate (DOP), and 6 parts by mass of dibutyl phthalate (DBP) were mixed. The mixture, after 40 parts by mass of polyvinylidene fluoride having a weight average molecular weight of 290,000 (PVDF, KF polymer #1000 manufactured by KUREHA CORPORATION) was added thereto, was again mixed in the Henschel mixer. This mixture was mixed and pelletized by a twin-screw kneading extruder.

The pellets obtained were melt-kneaded by the twin-screw kneading extruder (240° C.), and the melt was extruded from a circular ring hole to extrude melt having an outer diameter of 0.5 mm and an inner diameter of 0.4 mm in the extrusion face of a spinneret for forming hollow fiber attached to the extrusion outlet in the head of the extruder tip (235° C.). Simultaneously, nitrogen gas was allowed to be discharged from a round hole to inject a hollow part forming fluid having a diameter of 0.3 mm inside the circular ring hole to extrude melt and injected into the hollow part of the hollow fiber-like extrudate. The hollow fiber-like extrudate was introduced into a water bath (20° C.) at an aerial running distance of 4.5 cm and taken up at a rate of 14 m/min.

The hollow fiber-like material obtained was immersed in methylene chloride to extract DOP and DBP off in the hollow fiber-like material, and then dried. Subsequently, the material was immersed in a 50% by mass ethyl alcohol aqueous solution, and then, immersed in a 15% by mass sodium hydroxide aqueous solution at 60° C. for an hour to thereby extract the hydrophobic silica off in the hollow fiber-like material. Thereafter, the material was washed with water and dried to thereby provide a porous hollow fiber membrane made of polyvinylidene fluoride. Drawing operation was conducted in which a length of 50 cm of the porous hollow fiber membrane made of polyvinylidene fluoride obtained was drawn under tension in a 25° C. atmosphere to a length of 100 cm and then, the tension was released.

The properties of the hydrophobic porous hollow fiber membrane obtained by conducting the drawing operation are shown in Table 1, and electron micrographs and images after monochrome binarization are shown in FIG. 7.

An evaporation module (evaporation part) was produced by placing 49 hydrophobic porous hollow fiber membranes obtained in a polysulfone case having an inner diameter of 20 mm, and a condensation module (condensation part) was produced by placing 20 stainless tubes having an inner diameter of 1 mm and an outer diameter of 2 mm in a case identical to the one used for the evaporation part. As shown in FIG. 2, the evaporation part was connected with the condensation part such that the minimum distance between the outer surface of hydrophobic porous hollow fiber membranes in the evaporation part and the outer surface of the stainless tubes in the condensation part was 30 mm. The outlet of the condensation part was connected with the water collecting container via piping. As shown in FIG. 2, in order to adjust the pressure within the system from the water collecting container, a vacuum pump and a vacuum regulator were placed as the pressure reducing unit and the pressure regulator in FIG. 2.

Membrane distillation was conducted while simulated seawater at 65° C. (a 3.5% by mass sodium chloride aqueous solution) was allowed to flow through the hollow lumen of hydrophobic porous hollow fiber membranes in the evaporation part at a flow rate of 600 mL/min and cooling water at 30° C. was allowed to flow through the lumens, which is the inner region of the stainless tubes in the condensation part, at a flow rate of 600 mL/min for cooling, and the pressure inside the module system was allowed to be 10 kPa by adjustment with a vacuum pump.

Thirty minutes after the experiment was started, water contained in the water collecting container was collected. The Flux was a high value as 80.9 kg/m$^2$/h, and the electrical conductivity of the membrane distilled water was 0.0 μS/cm at 25° C. The results are shown in Table 1 and FIGS. 5 and 6.

Example 2

High density polyethylene (p=0.968, 2208) manufactured by Hi-Zex Co. Ltd.) as the raw material was melt-spun using a hollow double spinneret at an amount of the polymer extruded of 16 g/min, an amount of hollow $N_2$ of 23 mL/min, and a spinning rate of 200 m/min, and a spinning draft ratio of 3400 to thereby provide hollow fiber.

The hollow fiber obtained was annealed in an oven at 115° C. for two hours to thereby provide an undrawn membrane.

Cold drawing, hot drawing, and heat setting were sequentially conducted by using the undrawn membrane obtained.

In other words, first 30% cold drawing was conducted at room temperature, then, two-stage drawing of 200% at 100° C. and of additionally 40% at 115° C. was conducted, and subsequently, two-stage heat setting was conducted in a 128° C. air heating vessel by adjusting the rate between rolls to thereby provide a hydrophobic porous hollow fiber membrane.

The properties of the hydrophobic porous hollow fiber membrane obtained are shown in Table 1, and electron micrographs and images after monochrome binarization are shown in FIG. 8.

Membrane distillation was conducted in the same manner as in Example 1 by using 60 hydrophobic porous hollow fiber membranes obtained.

The Flux was a high value as 79.5 kg/m$^2$/h, and the electrical conductivity of the membrane distilled water obtained was 0.0 μS/cm at 25° C. The results are shown in Table 1 and FIGS. 3, 5 and 6.

Example 3

In a Henschel mixer, 23 parts by mass of a hydrophobic silica having an average primary particle size of 0.016 μm and a specific surface area of 110 m$^2$/g (AEROSIL-R972 manufactured by NIPPON AEROSIL CO., LTD.), 33 parts by mass of DOP, and 4 parts by mass of DBP were mixed, and 40 parts by mass of polyvinylidene fluoride having a weight average molecular weight of 290,000 (KF polymer #1000 manufactured by KUREHA CORPORATION) was added to the mixture, which was again mixed in the Henschel mixer. This mixture was mixed and pelletized by a twin-screw kneading extruder.

The pellets obtained were melt-kneaded by the twin-screw kneading extruder (230° C.), and the melt was extruded from a circular ring hole to extrude melt in the extrusion face of a spinneret for forming hollow fiber attached to the extrusion outlet in the head of the extruder tip. Simultaneously, nitrogen gas was allowed to be discharged from a round hole to inject a hollow part forming fluid inside the circular ring hole to extrude melt and injected into the hollow part of the hollow fiber-like extrudate. The hollow fiber-like extrudate was introduced into a water bath (40° C.) at an aerial running distance of 20 cm and taken up at a rate of 10 m/min.

This hollow fiber obtained was continuously retrieved by a pair of first caterpillar-belt-type retrievers at a rate of 10 m/min, and allowed to pass through a first heating vessel (0.8 m in length) of which spatial temperature was controlled to 40° C. The fiber was further retrieved by second caterpillar-belt-type retrievers similar to the first caterpillar-belt-type retrievers at a rate of 20 m/min to stretch the fiber at a ratio of 2.0. Subsequently, the fiber was allowed to pass through a second heating vessel (0.8 m in length) of which spatial temperature was controlled to 80° C., and then were continuously interposed and cooled between a pair of irregular-shaped rolls that were placed on the water surface of a cooling water bath, had a circumference of about 0.2 m and 4 protrusions, and were operated at a rotation rate of 170 rpm. Thereafter, the drawn fiber was retrieved by third caterpillar-belt-type retrievers at a rate of 15 m/min to achieve contraction at a ratio of 1.5, followed by being wound into a skein with a circumference of about 3 m.

The hollow fiber-like material obtained was immersed in methylene chloride to extract DOP and DBP off in the hollow fiber-like material, and then dried. Subsequently, the material was immersed in a 50% by mass ethyl alcohol aqueous solution, and then, immersed in a 5% by mass sodium hydroxide aqueous solution at 40° C. for an hour to thereby extract the hydrophobic silica in the hollow fiber-like material off. Thereafter, the material was washed with water and dried to thereby provide a porous hollow fiber membrane made of polyvinylidene fluoride.

The properties of the hydrophobic porous hollow fiber membrane obtained are shown in Table 1, and electron micrographs and images after monochrome binarization are shown in FIG. 9.

Membrane distillation was conducted in the same manner as in Example 1 by using 21 hydrophobic porous hollow fiber membranes obtained.

The Flux was a high value as 57.8 kg/m²/h, and the electrical conductivity of the membrane distilled water was 0.0 µS/cm at 25° C. The results are shown in Table 1 and FIGS. 5 and 6.

Example 4

In a Henschel mixer, 23 parts by mass of a hydrophobic silica having an average primary particle size of 0.016 µm and a specific surface area of 110 m²/g (AEROSIL-R972 manufactured by NIPPON AEROSIL CO., LTD.), 31 parts by mass of DOP, and 6 parts by mass of DBP were mixed. The mixture, after 40 parts by mass of polyvinylidene fluoride having a weight average molecular weight of 310,000 (Solef (registered trademark) 6010 manufactured by Solvay S.A.) was added thereto, was again mixed in the Henschel mixer. This mixture was mixed and pelletized by a twin-screw kneading extruder.

The pellets obtained were melt-kneaded by the twin-screw kneading extruder (240° C.), and the melt described above was extruded from a circular ring hole to extrude melt in the extrusion face of a spinneret for forming hollow fiber attached to the extrusion outlet in the head of the extruder tip. Simultaneously, nitrogen gas was allowed to be discharged from a round hole to inject a hollow part forming fluid inside the circular ring hole to extrude melt and injected into the hollow part of the hollow fiber-like extrudate. The hollow fiber-like extrudate was introduced into a water bath (40° C.) at an aerial running distance of 20 cm and taken up at a rate of 20 m/min.

This hollow fiber obtained was continuously retrieved by a pair of first caterpillar-belt-type retrievers at a rate of 20 m/min, and allowed to pass through a first heating vessel (0.8 m in length) of which spatial temperature was controlled to 40° C. The fiber was further retrieved by second caterpillar-belt-type retrievers similar to the first caterpillar-belt-type retrievers at a rate of 40 m/min to stretch the fiber at a ratio of 2.0. Subsequently, the fiber was allowed to pass through a second heating vessel (0.8 m in length) of which spatial temperature was controlled to 80° C., and then were continuously interposed and cooled while being periodically bended between a pair of irregular-shaped rolls that were placed on the water surface of a cooling water bath at 20° C., had a circumference of about 0.2 m and 4 protrusions, and were operated at a rotation rate of 170 rpm. Thereafter, the fiber was retrieved by third caterpillar-belt-type retrievers at a rate of 30 m/min to achieve contraction at a ratio of 1.5, followed by being wound into a skein with a circumference of about 3 m.

The hollow fiber-like material obtained was immersed in methylene chloride to extract DOP and DBP off in the hollow fiber-like material, and then dried. Subsequently, the material was immersed in a 50% by mass ethyl alcohol aqueous solution, and then, immersed in a 5% by mass sodium hydroxide aqueous solution at 40° C. for an hour to thereby extract the silica in the hollow fiber-like material off. Thereafter, the material was washed with water and dried to thereby provide a porous hollow fiber membrane made of polyvinylidene fluoride.

The properties of the hydrophobic porous hollow fiber membrane obtained are shown in Table 1, and electron micrographs and images after monochrome binarization are shown in FIG. 10.

Membrane distillation was conducted in the same manner as in Example 1 by using 40 hydrophobic porous hollow fiber membranes obtained.

The Flux was a high value as 55.2 kg/m²/h, and the electrical conductivity of the membrane distilled water obtained was 0.0 µS/cm at 25° C. The results are shown in Table 1 and FIGS. 5 and 6.

Example 5

A hydrophobic porous hollow fiber membrane was obtained in the same manner as in Example 1 except that no drawing operation was conducted after silica removal.

The properties of the hydrophobic porous hollow fiber membrane obtained are shown in Table 1, and electron micrographs and images after monochrome binarization are shown in FIG. 11.

Membrane distillation was conducted in the same manner as in Example 1 by using 49 hydrophobic porous hollow fiber membranes obtained.

The Flux was 55.1 kg/m²/h, and the electrical conductivity of the membrane distilled water obtained was 0.0 µS/cm at 25° C. The results are shown in Table 1 and FIGS. 5 and 6.

Example 6

In a Henschel mixer, 34 parts by mass of a hydrophobic silica having an average primary particle size of 0.016 µm and a specific surface area of 110 m²/g (AEROSIL-R972 manufactured by NIPPON AEROSIL CO., LTD.), 34 parts by mass of DOP, and 7 parts by mass of DBP were mixed, and 25 parts by mass of polyvinylidene fluoride having a weight average molecular weight of 290,000 (KF polymer #1000 manufactured by KUREHA CORPORATION) was added to the mixture, which was again mixed in the Henschel mixer. This mixture was mixed and pelletized by a twin-screw kneading extruder.

The pellets obtained were melt-kneaded by the twin-screw kneading extruder (250° C.), and the melt was extruded from a circular ring hole to extrude melt in the extrusion face of a spinneret for forming hollow fiber attached to the extrusion outlet in the head of the extruder tip (245° C.). Simultaneously, nitrogen gas was allowed to be discharged from a round hole to inject a hollow part forming fluid inside the circular ring hole to extrude melt and injected into the hollow part of the hollow fiber-like extrudate. The hollow fiber-like extrudate was introduced into a water bath (30° C.) at an aerial running distance of 30 cm and taken up at a rate of 30 m/min.

The hollow fiber-like material obtained was immersed in methylene chloride to extract DOP and DBP off in the hollow fiber-like material, and then dried. Subsequently, the material was immersed in a 40% by mass ethyl alcohol aqueous solution, and then, immersed in a 20% by mass sodium hydroxide aqueous solution at 70° C. for an hour to thereby extract the hydrophobic silica in the hollow fiber-like material off. Thereafter, the material was washed with water and dried to thereby provide a porous hollow fiber membrane made of polyvinylidene fluoride.

The properties of the hydrophobic porous hollow fiber membrane obtained are shown in Table 1, and electron micrographs and images after monochrome binarization are shown in FIG. 12.

Membrane distillation was conducted in the same manner as in Example 1 by using 34 hydrophobic porous hollow fiber membranes obtained.

The Flux was a high value as 51.7 kg/m²/h, and the electrical conductivity of the membrane distilled water was 0.0 μS/cm at 25° C. The results are shown in Table 1 and FIGS. 5 and 6.

Example 7

A hydrophobic porous hollow fiber membrane was obtained in the same manner as in Example 4 except that a spinneret for forming hollow fiber was used in which the diameter of the circular ring hole to extrude melt and the diameter of the round hole to inject a hollow part forming fluid are different.

The properties of the hydrophobic porous hollow fiber membrane obtained are shown in Table 1, and electron micrographs and images after monochrome binarization are shown in FIG. 13.

Membrane distillation was conducted in the same manner as in Example 1 by using 35 hydrophobic porous hollow fiber membranes obtained.

The Flux was a high value as 49.1 kg/m²/h, and the electrical conductivity of the membrane distilled water was 0.0 μS/cm at 25° C. The results are shown in Table 1 and FIGS. 5 and 6.

Example 8

A two-layer hydrophobic porous hollow fiber membrane was obtained in the same manner as in Example 3 except that two extruders were used and that a mixture having the composition of Example 3 as an inner layer and a melt-kneaded product of Example 4 as an outer layer were extruded concurrently through the nozzles for coextrusion to obtain a two-layer structure.

The properties of the hydrophobic porous hollow fiber membrane obtained are shown in Table 1.

Membrane distillation was conducted in the same manner as in Example 1 by using 35 hydrophobic porous hollow fiber membranes obtained.

The Flux was a high value as 55.0 kg/m²/h, and the electrical conductivity of the membrane distilled water was 0.0 μS/cm at 25° C. The results are shown in Table 1 and FIGS. 5 and 6.

Example 9

Under the spinning conditions of Example 2, the same spinning and annealing treatment was conducted except that the amount of polymer discharged was set to 14.5 g/min and the amount of hollow $N^2$ was set to 20 mL/min to thereby provide an undrawn membrane.

A hydrophobic porous hollow fiber membrane was obtained by sequentially conducting cold drawing, hot drawing, and heat setting in the same manner as in Example 2 by using an undrawn membrane obtained except that two-stage heat setting was conducted in a 131° C. air heating vessel by adjusting the rate between rolls.

The properties of the hydrophobic porous hollow fiber membrane obtained are shown in Table 1, and electron micrographs and images after monochrome binarization are shown in FIG. 14.

Membrane distillation was conducted in the same manner as in Example 1 by using 60 hydrophobic porous hollow fiber membranes obtained.

The Flux was 37.9 kg/m²/h, and the electrical conductivity of the membrane distilled water was 0.0 μS/cm at 25° C. The results are shown in Table 1 and FIGS. 5 and 6.

Example 10

A spinning dope was obtained by dissolving 13 parts by mass of polyvinylidene fluoride having a weight average molecular weight of 750,000 (Solef (registered trademark) 6020 manufactured by Solvay S.A.) and 9 parts by mass of ethylene glycol in 78 parts by mass of N-methyl-2-pyrrolidone at 50° C.

The spinning dope obtained was extruded through a double tubular nozzle (an outermost diameter of 1.5 mm, an intermediate diameter of 0.7 mm, and an innermost diameter of 0.5 mm) together with water, the inner liquid, and allowed to pass through an aerial running distance of 300 mm to be coagulated in water at 50° C. Subsequently, the coagulate was desolvated in water at 50° C. in a separate bath. Additionally, the coagulate was dried in a dryer at 60° C. for 8 hours to thereby provide a hydrophobic porous hollow fiber membrane.

The properties of the hydrophobic porous hollow fiber membrane obtained are shown in Table 1, and electron micrographs and images after monochrome binarization are shown in FIG. 15.

Membrane distillation was conducted in the same manner as in Example 1 by using 20 hydrophobic porous hollow fiber membranes.

The Flux was 38.0 kg/m²/h, and the electrical conductivity of the membrane distilled water was 0.0 μS/cm at 25° C. The results are shown in Table 1 and FIGS. 5 and 6.

Example 11

Membrane distillation was conducted in the same manner as in Example 2 except that the pressure in the module system was changed from 10 kPa to 20 kPa. The Flux was 28.7 kg/m²/h, and the electrical conductivity of the membrane distilled water obtained was 0.0 μS/cm at 25° C. The results are shown in FIG. 3.

Example 12

Membrane distillation was conducted in the same manner as in Example 2 except that the temperature of the simulated seawater was changed from 65° C. to 55° C. The Flux was 36.2 kg/m²/h, and the electrical conductivity of the membrane distilled water obtained was 0.0 μS/cm at 25° C. The results are shown in FIG. 4.

Example 13

Membrane distillation was conducted in the same manner as in Example 12 except that the pressure in the module system was changed from 10 kPa to 8 kPa. The Flux was 46.8 kg/m²/h, and the electrical conductivity of the membrane distilled water was 0.0 μS/cm at 25° C. The results are shown in FIG. 4.

Example 14

Membrane distillation was conducted in the same manner as in Example 12 except that the pressure in the module system was changed from 10 kPa to 15 kPa. The Flux was 5.5 kg/m²/h, and the electrical conductivity of the membrane distilled water was 0.0 μS/cm at 25° C. The results are shown in FIG. 4.

Comparative Example 1

Membrane distillation was conducted in the same manner as in Example 2 except that the pressure in the module system was changed from 10 kPa to 26 kPa. The Flux was 1.0 kg/m²/h, and the electrical conductivity of the membrane distilled water was 0.0 μS/cm at 25° C. The results are shown in FIG. 3.

Comparative Example 2

Membrane distillation was conducted in the same manner as in Example 2 except that the pressure in the module system was changed from 10 kPa to 30 kPa. The Flux was 0.6 kg/m²/h, and the electrical conductivity of the membrane distilled water obtained was 0.0 μS/cm at 25° C. The results are shown in FIG. 3.

Comparative Example 3

Membrane distillation was conducted in the same manner as in Example 2 except that the pressure in the module system was changed from 10 kPa to 50 kPa. The Flux was 0.0 kg/m²/h, no membrane distilled water was obtained, and the electrical conductivity could not be measured. The results are shown in FIG. 3.

Comparative Example 4

Membrane distillation was conducted in the same manner as in Example 2 except that the pressure in the module system was changed from 10 kPa to 100 kPa. The Flux was 0.0 kg/m²/h, no membrane distilled water was obtained, and the electrical conductivity could not be measured. The results are shown in FIG. 3.

Comparative Example 5

Membrane distillation was conducted in the same manner as in Example 12 except that the pressure in the module system was changed from 10 kPa to 20 kPa. The Flux was 0.4 kg/m²/h, and the electrical conductivity of the membrane distilled water obtained was 0.0 μS/cm at 25° C. The results are shown in FIG. 4.

Comparative Example 6

Membrane distillation was conducted in the same manner as in Example 12 except that the pressure in the module system was changed from 10 kPa to 30 kPa. The Flux was 0.0 kg/m²/h, no membrane distilled water was obtained, and the electrical conductivity could not be measured. The results are shown in FIG. 4.

Comparative Example 7

Membrane distillation was conducted in the same manner as in Example 12 except that the pressure in the module system was changed from 10 kPa to 50 kPa. The Flux was 0.0 kg/m²/h, no membrane distilled water was obtained, and the electrical conductivity could not be measured. The results are shown in FIG. 4.

Comparative Example 8

Membrane distillation was conducted in the same manner as in Example 12 except that the pressure in the module system was changed from 10 kPa to 100 kPa. The Flux was 0.0 kg/m²/h, no membrane distilled water was obtained, and the electrical conductivity could not be measured. The results are shown in FIG. 4.

The relationship between the pressure in the module system and the Flux in Examples 2 and 11 and Comparative Examples 1 to 4 is shown in FIG. 3.

The relationship between the pressure in the module system and the Flux in Examples 12 to 14 and Comparative Examples 5 to 8 is shown in FIG. 4.

From the results of FIG. 3 and FIG. 4, it can be understood that an excellent Flux can be provided by setting the pressure of the gas phase parts 1 to 3 to the saturated steam pressure of water at the temperature of water to be treated or less.

The relationship between the porosity of the inner surface and the Flux of the hydrophobic porous hollow fiber membranes each provided in Examples 1 to 10 is shown in FIG. 5.

The relationship between air permeation coefficient and the Flux of the hydrophobic porous hollow fiber membranes each provided in Examples 1 to 10 is shown in FIG. 6.

From the results of FIG. 5 and FIG. 6, it can be understood that an excellent Flux can be provided by setting the surface porosity of the inner surface and the air permeation coefficient of the hydrophobic porous hollow fiber membrane to a specified value or more.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Hydrophobic polymer | PVDF | Polyethylene | PVDF | PVDF | PVDF | PVDF | PVDF | PVDF | Polyethylene | PVDF |
| Outer diameter/inner diameter [mm] | 0.64/0.46 | 0.45/0.35 | 1.9/1.1 | 0.96/0.58 | 0.69/0.51 | 1.2/0.68 | 1.22/0.66 | 1.24/0.67 | 0.38/0.28 | 1.24/0.89 |
| Membrane thickness [μm] | 88 | 50 | 400 | 190 | 94 | 260 | 260 | 285 | 50 | 175 |
| Average pore diameter [μm] | 0.56 | 0.30 | 0.60 | 0.27 | 0.25 | 0.25 | 0.27 | 0.31 | 0.10 | n/a |
| Surface porosity [%] | Inner surface 27 Outer surface 25 | Inner surface 32 Outer surface 29 | Inner surface 24 Outer surface 22 | Inner surface 30 Outer surface 19 | Inner surface 24 Outer surface 20 | Inner surface 26 Outer surface 21 | Inner surface 28 Outer surface 12 | Inner surface 24 Outer surface 15 | Inner surface 18 Outer surface 19 | Inner surface 17 Outer surface 1 |
| Void ratio [%] | 76 | 78 | 73 | 72 | 63 | 71 | 72 | 75 | 77 | 88 |
| Air permeation coefficient [m³/m² · sec · Pa] | 3.2E−06 | 1.6E−06 | 2.2E−06 | 1.3E−06 | 1.4E−06 | 1.3E−06 | 9.6E−07 | 1.0E−06 | 6.1E−07 | 6.1E−07 |
| Flux [kg/m²/h] | 81 | 80 | 58 | 55 | 55 | 52 | 49 | 55 | 38 | 38 |
| Water Conductivity [μS/cm] (25° C.) | 0.0 | 0.0 | 0.0 | 0.0 | 0.0 | 0.0 | 0.0 | 0.0 | 0.0 | 0.0 |

This application is based on Japanese Patent Application (Patent Application No. 2014-142543) filed on Jul. 10, 2014 and Japanese Patent Application (Patent Application No. 2015-94364) filed on May 1, 2015, the contents of which are incorporated herein by way of reference.

INDUSTRIAL APPLICABILITY

The membrane distillation apparatus and hydrophobic porous membrane of the present invention can be suitably utilized in the field of water treatment and can be used in pure water supply systems.

REFERENCE SIGNS LIST 1 hydrophobic porous membrane
2 condenser

The invention claimed is:

1. A membrane distillation apparatus comprising a hydrophobic porous membrane having
   (i) a surface porosity of a membrane surface that is configured to come into contact with water to be treated of 24% or more and 32% or less,
   (ii) a surface porosity of a membrane surface that is configured not to come into contact with water to be treated of 12% or more and 29% or less,
   wherein the surface porosity of the membrane surface that is configured to come into contact with water is bigger than the surface porosity of the membrane surface that is configured not to come into contact with water, and
   (iii) an air permeation coefficient of $8.0 \times 10^{-7}$ $m^3/m^2 \cdot sec \cdot Pa$ or more and $1.0 \times 10^{-5}$ $m^3/m^2 \cdot sec \cdot Pa$ or less.

2. The membrane distillation apparatus according to claim 1, further comprising:
   an evaporation part comprising a liquid phase part 1 in which water to be treated flows, a gas phase part 1, and a hydrophobic porous membrane that separates the liquid phase part 1 and the gas phase part 1,
   a condensation part comprising a liquid phase part 2 in which cooling water flows, a gas phase part 2, and a cooling member that separates the liquid phase part 2 and the gas phase part 2, and
   a gas phase part 3 connecting the gas phase part 1 with the gas phase part 2,
   wherein the pressure of the gas phase parts 1 to 3 is 1 kPa or higher and the saturated steam pressure of water at the temperature of water to be treated or lower.

3. The membrane distillation apparatus according to claim 2, wherein the pressure of the gas phase parts 1 to 3 is 1 kPa or higher and lower than or equal to a pressure lower by at least 5 kPa than the saturated steam pressure of water at the temperature of water to be treated.

4. The membrane distillation apparatus according to claim 2, wherein the pressure of the gas phase parts 1 to 3 is 1 kPa or higher and lower than or equal to a pressure lower by at least 10 kPa than the saturated steam pressure of water at the temperature of water to be treated.

5. The membrane distillation apparatus according to claim 2, wherein the minimum distance between the hydrophobic porous membrane and the cooling member is 10 mm or more.

6. The membrane distillation apparatus according to claim 2, wherein the temperature of water to be treated is 50° C. or more.

7. The membrane distillation apparatus according to claim 2, wherein the hydrophobic porous membrane comprises at least one resin selected from the group consisting of polysulfone, polyethersulfone, polyethylene, polypropylene, polyvinylidene fluoride, and polytetrafluoroethylene.

8. The membrane distillation apparatus according to claim 7, wherein the hydrophobic porous membrane comprises a membrane surface modified by fluorine plasma treatment.

9. The membrane distillation apparatus according to claim 1, wherein the surface porosity of the membrane surface that is configured to come into contact with water to be treated is 25% or more.

10. The membrane distillation apparatus according to claim 9, wherein the surface porosity of another membrane surface of said membrane opposite to the membrane surface that is configured to come into contact with water to be treated is 25% or more.

11. The membrane distillation apparatus according to claim 10, wherein the surface porosity of each of the membrane surface that is configured to come into contact with water to be treated and said another membrane surface opposite to the membrane surface is 25% or more and 70% or less.

12. The membrane distillation apparatus according to claim 10, wherein the surface porosity of each of the membrane surface that is configured to come into contact with water to be treated and said another membrane surface opposite to the membrane surface is 25% or more and 35% or less.

13. The membrane distillation apparatus according to claim 1, wherein the air permeation coefficient is $1.6 \times 10^{-6}$ $m^3/m^2 \cdot sec \cdot Pa$ or more and $1.0 \times 10^{-5}$ $m^3/m^2 \cdot sec \cdot Pa$ or less.

14. The membrane distillation apparatus according to claim 1, wherein the air permeation coefficient is $1.6 \times 10^{-6}$ $m^3/m^2 \cdot sec \cdot Pa$ or more and $3.2 \times 10^{-6}$ $m^3/m^2 \cdot sec \cdot Pa$ or less.

15. The membrane distillation apparatus according to claim 1, wherein the average pore diameter is 0.20 μm or more, and the void ratio is 60% or more.

16. The membrane distillation apparatus according to claim 1, wherein the hydrophobic porous membrane is a hollow fiber membrane.

17. A distillation method comprising using the membrane distillation apparatus according to claim 1, wherein the pressure of the gas phase parts 1 to 3 is 1 kPa or higher and lower than or equal to a pressure lower by at least 5 kPa than the saturated steam pressure of water at the temperature of water to be treated.

18. The membrane distillation apparatus according to claim 1, wherein the air permeation coefficient is $1.2 \times 10^{-6}$ $m^3/m^2 \cdot sec \cdot Pa$ or more and $1.0 \times 10^{-5}$ $m^3/m^2 \cdot sec \cdot Pa$ or less.

19. The membrane distillation apparatus according to claim 1, wherein the hydrophobic porous membrane includes a hydrophobic polymer as a main component.

20. The membrane distillation apparatus according to claim 1, wherein the hydrophobic porous membrane includes a hydrophobic polymer, and wherein a content of the hydrophobic polymer is 99% by mass or more in components constituting the hydrophobic porous membrane.

* * * * *